United States Patent [19]

Beadle et al.

[11] 4,055,787
[45] Oct. 25, 1977

[54] INTERRUPTABLE NUMERICAL CONTOURING CONTROL SYSTEM WITH RETURN TO PATH SAFEGUARDS

[75] Inventors: Bruce R. Beadle; Eugene A. Olig, both of Fond Du Lac, Wis.

[73] Assignee: Giddings & Lewis, Inc., Fond du Lac, Wis.

[21] Appl. No.: 599,591

[22] Filed: July 28, 1975

[51] Int. Cl.² ............................................. G05B 7/00
[52] U.S. Cl. .................................. 318/591; 318/569; 364/119
[58] Field of Search ................ 318/591, 573, 574, 569

[56] References Cited

U.S. PATENT DOCUMENTS

| | | | |
|---|---|---|---|
| 3,576,535 | 4/1971 | Turner | 340/147 |
| 3,668,379 | 6/1972 | Roberts et al. | 235/183 X |
| 3,766,460 | 10/1973 | Hentz et al. | 318/571 |
| 3,940,593 | 2/1976 | Bleak et al. | 235/150.1 |
| 3,942,088 | 3/1976 | Yosioka et al. | 318/591 |

Primary Examiner—Robert K. Schaefer
Assistant Examiner—John J. Feldhaus
Attorney, Agent, or Firm—Leydig, Voit, Osann, Mayer & Holt

[57] ABSTRACT

A numerical control contouring system in which successive path segments are executed according to successive blocks of command signals making up a path program, the system being interruptable at any time by a feedhold signal to stop the controlled movable member at a random point on the path. The system is characterized by the improvement of preventing the system from resuming normal operation unless and until the member is returned to the path stopping point after it has been, for any reason, displaced therefrom under manual control or the like. In one embodiment, the axis component displacements of the member from the stopping point are represented by signals created and displayed, and the operator's restart pushbutton switch is rendered ineffective until the displayed displacement signals are reduced to zero. In another embodiment, the axis component displacement signals are utilized to create a non-program block of command signals, and means responsive to a restart signal first cause the member to be moved back to the path stopping point before the system is automatically restored to normal operation. In a third embodiment, after each movement of the controlled member following its arrival at the stopping point, the axis components for that movement are signaled and stored, and means responsive to a restart signal first utilize such stored signals to execute such movements in reverse order and senses to return the member to the path stopping point, and next restore normal operation of the system so that movement along the path is resumed.

24 Claims, 16 Drawing Figures

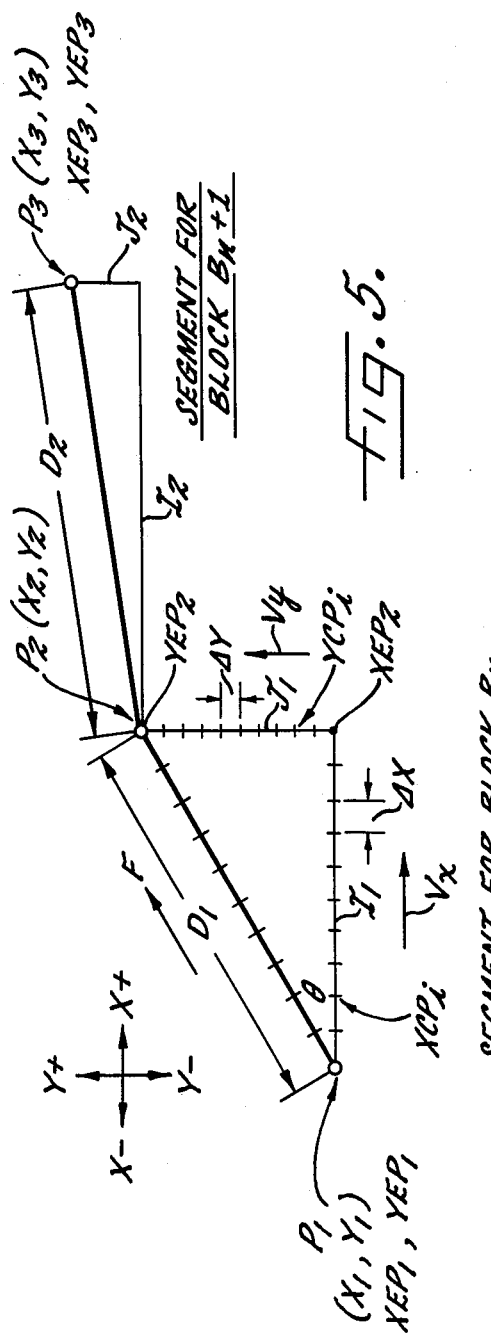
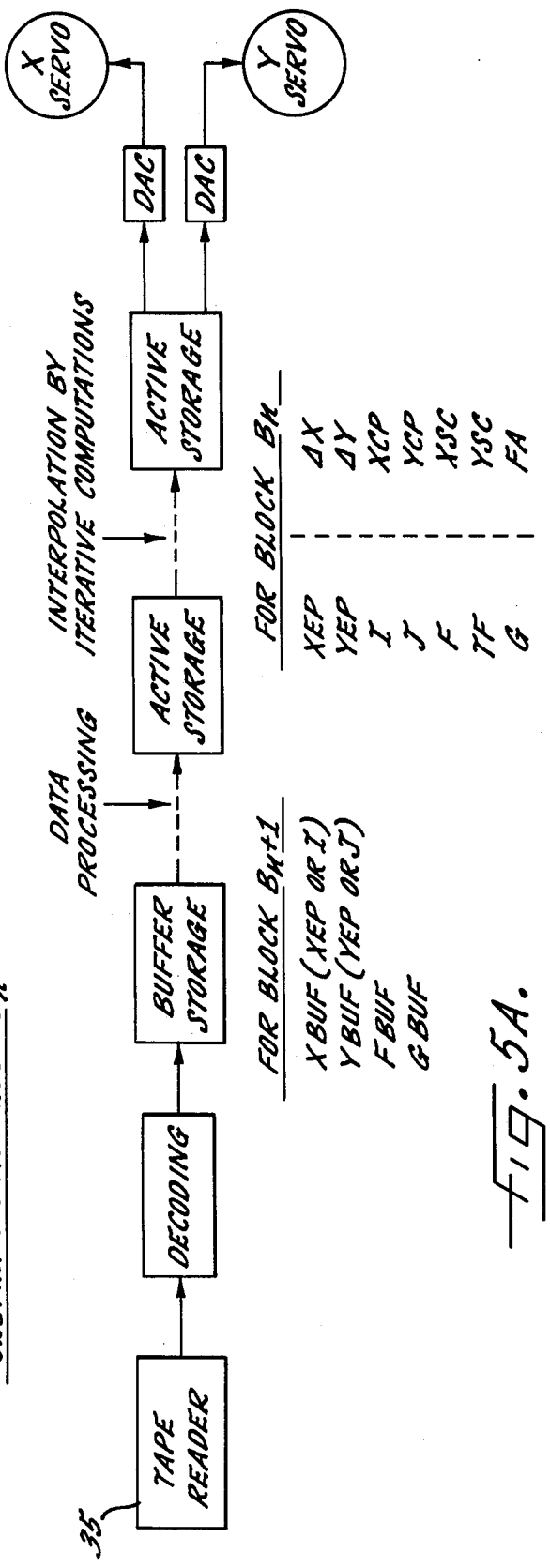

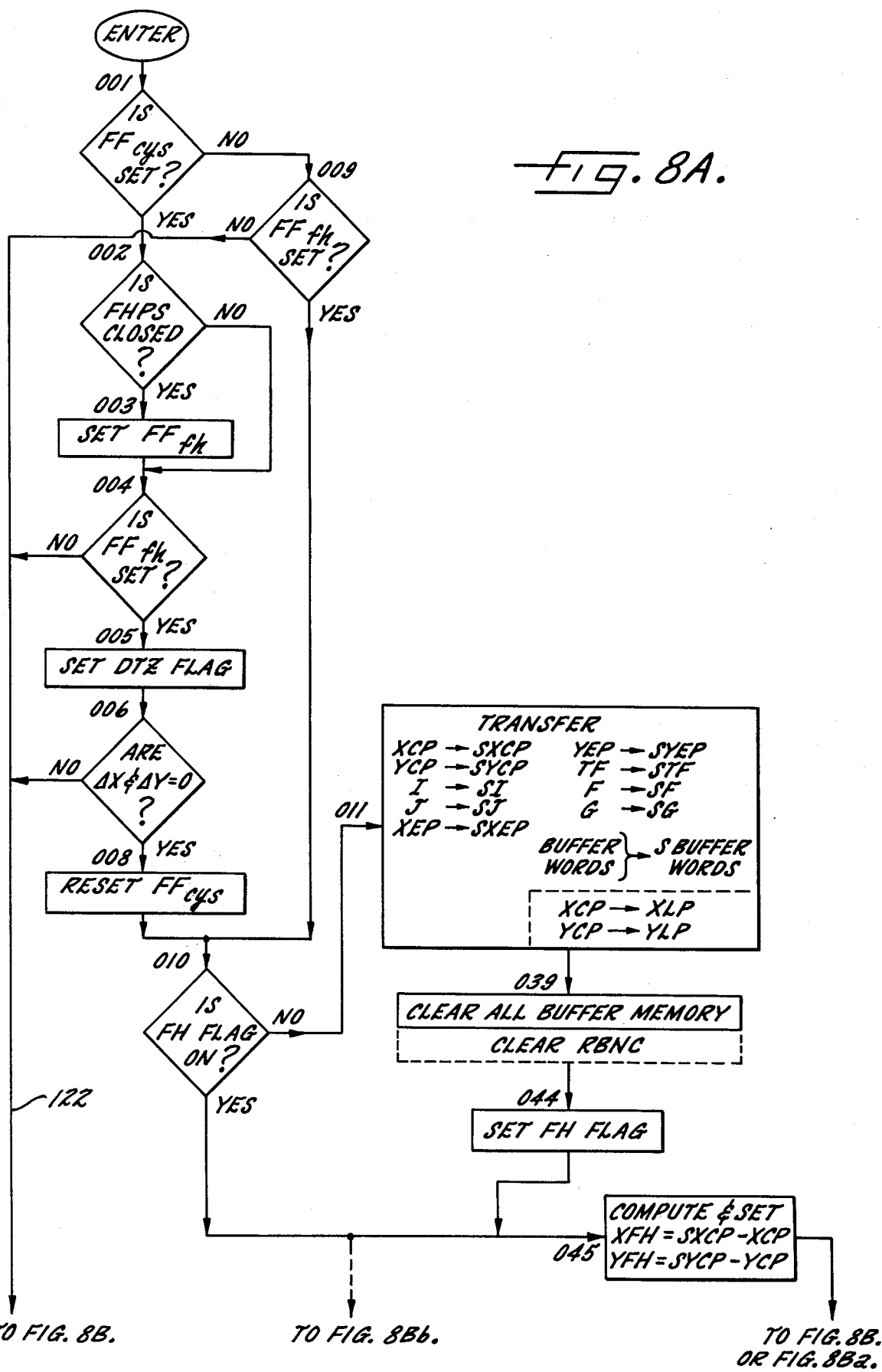

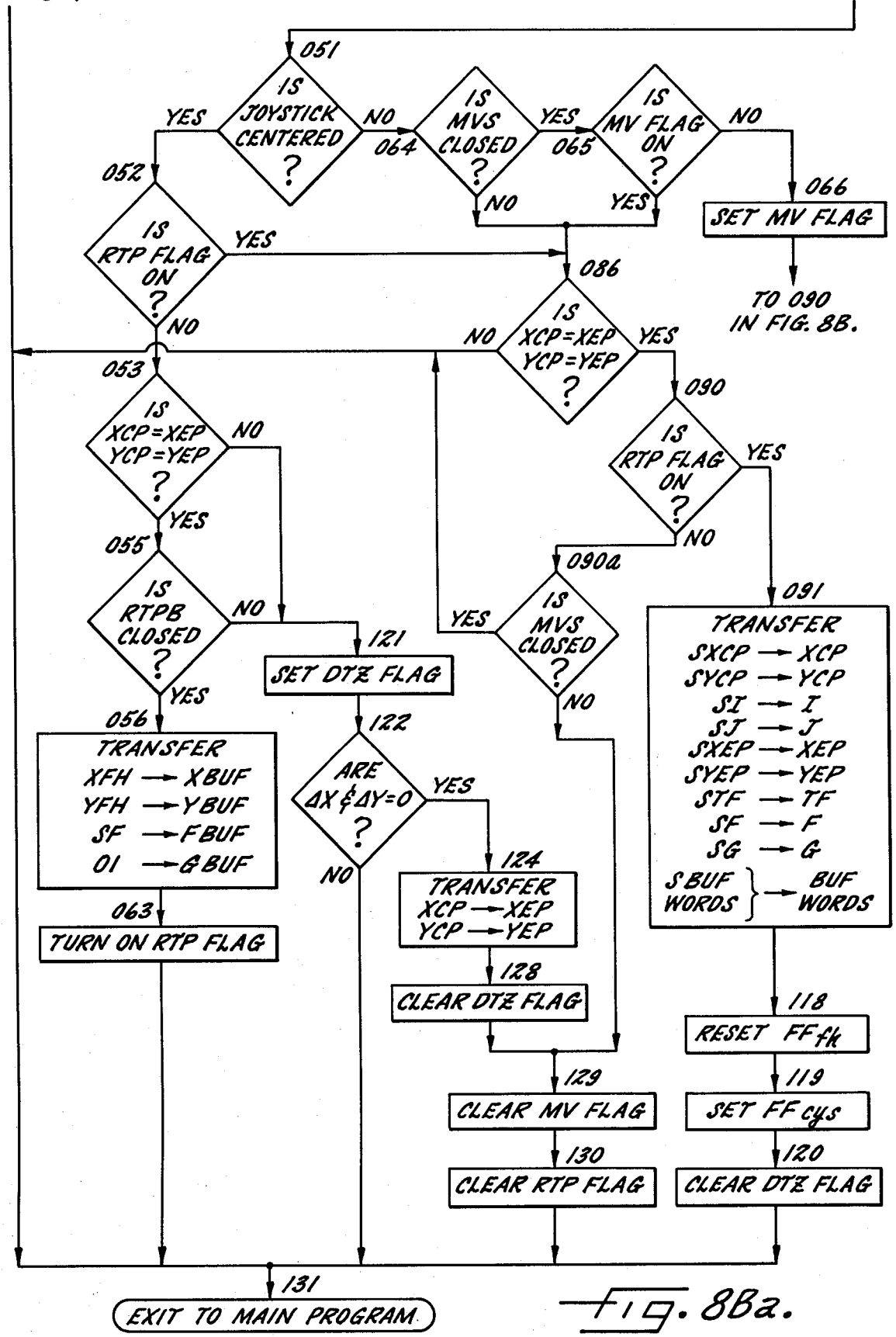
Fig. 8B2.

INTERRUPTABLE NUMERICAL CONTOURING CONTROL SYSTEM WITH RETURN TO PATH SAFEGUARDS

BACKGROUND AND FIELD OF THE INVENTION

The present invention relates in general to numerical control systems, and in particular to contouring or path controls for moving a member simultaneously along two or more axes according to program of command signals. Such numerical control systems are per se well known in the art; they find use in controlling multi-axis machine tools but are equally well applied to other devices such as drafting machines, welding or flame cutting machines, painting or assembly robots, and so on.

The invention pertains more specifically to improvements in such numerical contouring control systems which are randomly interruptable, for emergency purposes or otherwise, to bring the controlled member to an immediate stop at a random point on the programmed path—this sometimes being called the "feedhold" function. When the member is so stopped, it is often moved away from its stopping point in one or several manually controlled motions so that (in the machine tool environment) a cutting tool may be inspected or changed, or the workpiece may be measured or inspected. When the controlled member is so removed from the programmed path—in directions and distances which cannot be determined or forecast in advance—it is vital that the member be returned to its stopping point on the path before the system is restarted into normal operation. Otherwise, the member might be driven into damaging contact with the workpiece, or the subsequent motions of the member may never get back to precise following of the desired path.

In some prior numerical control systems, a feedhold stop, followed by arbitrary movement of the controlled member away from the path stopping point, required that the punched tape or other source of block command signals be "backed up" to a known block in the program sequence, and that the member be moved by the operator to reference coordinates specified by the programmer in a data sheet supplied to the operator. This was inconvenient and time consuming, and could result in damage to machine, cutter, or workpiece if the operator forgot to re-reference the system before hitting the restart switch. In other systems, a feedhold signal would let movement of the member progress until a specified location along the path was reached—so that stopping of the member might be delayed until after some damage occurred. If such damage did not occur, and the member was moved away from the stopping point on the path, the machine operator's forgetting to restore the member to a reference location before actuating the restart switch could produce the same difficulties noted above.

SUMMARY AND OBJECTIVES OF THE INVENTION

The general aim of the present invention is to render the restarting of a numerical control system, after it has been interrupted and the controlled member displaced from the path, safer, more convenient and less time consuming. A coordinate objective is to increase the production efficiency of a numerical control system and its controlled machine, while lessening the responsibilities and memory burdens of the human operator.

Another object of the invention is to provide an improved numerical contouring control system in which the controlled member may be brought promptly to a stop on the path in response to any randomly timed feedhold signal, and thereafter moved under manual control away from the path, —and yet in which restarting of the system into normal operation is inhibited until the member is, in one way or another, restored to its original stopping point. The operator cannot "forget" and thus cause damage or disaster.

It is a further object to facilitate the return of the displaced member to the stopping point on the path, so that normal operation of the system may be resumed quickly, accurately and without malfunction or damage.

Another and more specific object of the invention in one of its forms is to provide a visual display or indication which tells the operator the axis component displacements between the path stopping point and the existing location of the member, so that the operator may move the member easily back to the stopping point which is at any random location along the path.

Still another and specific object of the invention in one of its forms is to provide for automatic return of a member to a stopping point on the path after it has been displaced therefrom in any way, and merely in response to a restart signal initiated by an operator.

A related object of the invention, in one form, is to provide for the automatic restoration of the numerical control system to normal operation after and as a result of the controlled member returning to a path stopping point from which it has been displaced.

Yet another object of the invention is to provide improvements in a numerical control system by which a restart signal results in the controlled member, which has been stopped at a random point on the path and then displaced therefrom in a series of segmental motions of arbitrary lengths and directions, returning to the stopping point by following the segmental motions in reverse order and senses—so that the member returns to the path via exactly the same route it has been displaced therefrom. This avoids any worry, present in certain types of controlled machines, that the automatic return to the path stopping point might cause collision of the member with holding fixtures or structural parts of the machine.

BRIEF DESCRIPTION OF THE DRAWINGS

These and other objects and advantages of the invention will become apparent as the following description proceeds with reference to the accompanying drawings, in which:

FIG. 5 is a vector diagram illustrating the geometrical relationships of successive path segments;

FIG. 5A is a non-structural illustration of the relationships of signals as they are received, derived and utilized in the numerical control device shown in FIGS. 1 and 6;

FIGS. 8A, 8B and 8C when joined vertically form a flow chart to illustrate the program which is fed to and conditions the numerical control device of FIGS. 1, 6 and 7 to create a first embodiment of the present invention;

FIG. 8B$a$ (taken with FIGS. 8A and 8C and portions of FIG. 8B) is a modified flow chart illustrating an alternative program fed to the numerical control device to create a second embodiment of the invention;

FIG. 8B$b$ (taken with FIGS. 8A and 8C and portions of FIG. 8B) is another modified flow chart to illustrate a further alternative program fed to the numerical control device to create a third embodiment of the invention;

Figure 1:
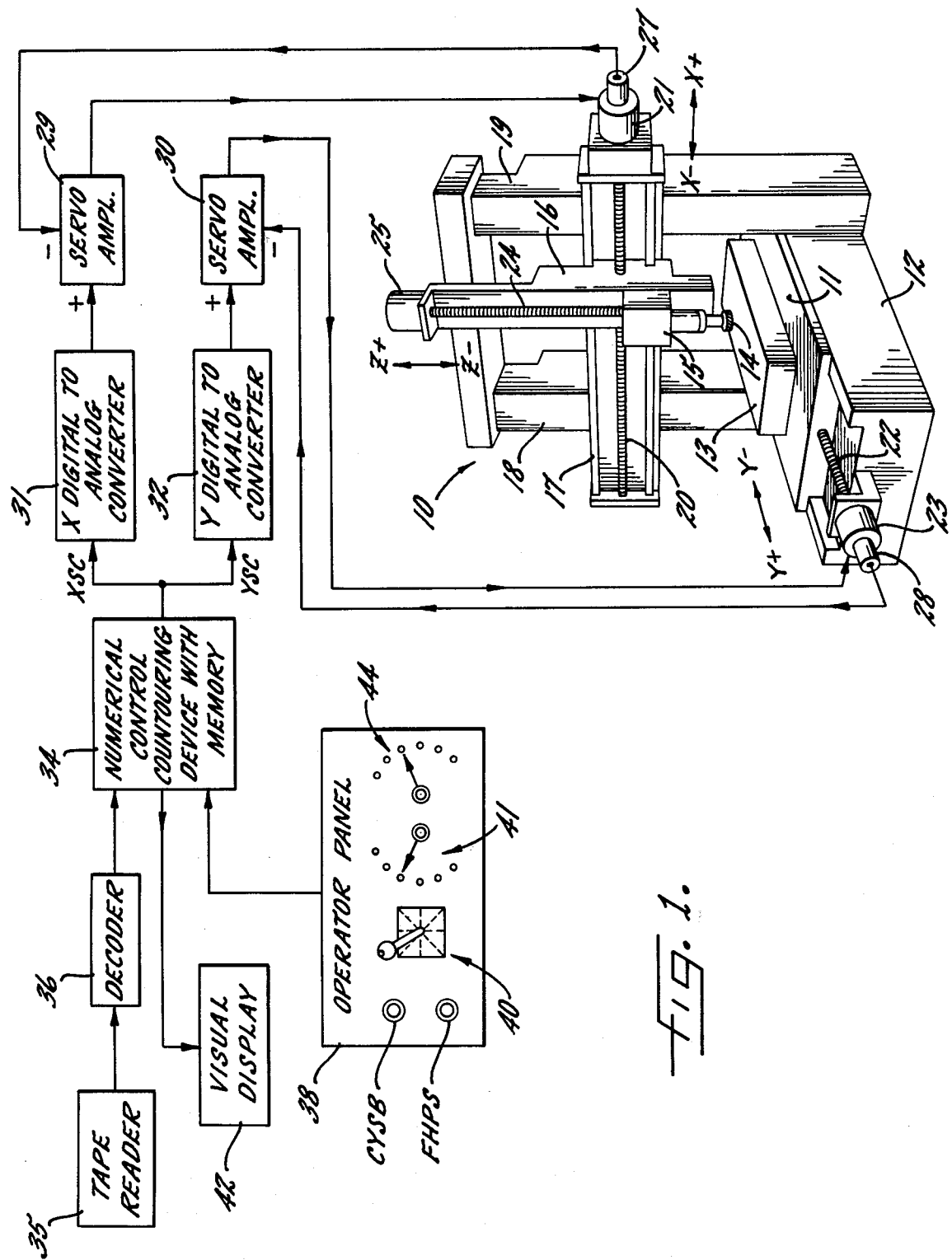
FIG. 1 is a generalized diagrammatic representation of a numerical control system and a controlled machine tool.

While the invention has been shown and will be described in some detail with reference to exemplary, preferred embodiments, there is no intention that it thus be limited to such detail. On the contrary, it is intended here to cover all modifications, alternatives and equivalents which fall within the spirit and scope of the invention as defined by the appended claims.

DESCRIPTION OF PREFERRED EMBODIMENTS

As noted above, the present invention comes as an improvement in numerical control systems which are per se well known to those skilled in the art. To make the invention more quickly understood, however, it will be helpful to set out briefly by way of review the basic organization and operation of one typical numerical contouring system before proceeding to the more detailed explanation of the novel improvement and its advantageous operations.

A. AN EXEMPLARY MACHINE TOOL

In order to illustrate one particular environment in which the present invention will find especially advantageous use, it will be described here with reference to controlling paths described by an element of a numerically controlled milling machine along two mutually orthogonal axes. A milling machine 10 (shown in FIG. 1) is typical of the many different types of machine tools or other machines such as flame cutters, cloth cutters, drafting machines and the like which may be numerically controlled in response to successive blocks of command signals each representing one segment of a pre-programmed path. The exemplary milling machine includes a work table 11 movable horizontally along a bed 12 and adapted to carry a workpiece 13 which is to be machined to a desired contour in the X-Y plane. A rotatably driven milling cutter 14 is mounted on, and vertically movable with, a ram 15 which is slidable within vertical ways (not shown) formed on a saddle 16, the latter in turn being movable horizontally along the ways of a rail 17 which is supported at its opposite ends by spaced columns 18 and 19. The cutting tool 14 may thus be moved along horizontal orthogonal X and Y axes relative to the workpiece 13 and in addition may be moved along vertical Z axis at right angles to the X horizontal axis.

By proper proportioning of the X, Y and Z axis components of commanded movement and velocity, the milling tool 14 moves through the workpiece 13 along a path and at a depth to cut a desired contour thereon. To produce such controlled movement of the workpiece 13 and the cutter 14, the saddle 16 includes a nut (not shown) engaged with a lead screw 20 driven through suitable gears (not shown) by a reversible servomotor 21. As the latter motor is caused to rotate in one direction or the other at different speeds, the saddle 16 will be moved horizontally in $+X$ or $-X$ directions and at velocities determined by the speed of the motor. Correspondingly, the ram 15 carries a nut (not shown) engaged with a vertically disposed lead screw 24 driven by a reversible servomotor 25 so that energization of that motor in one direction or the other moves the cutter 14 in $+Z$ or $-Z$ directions. Finally, the table 11 also carries a nut (not shown) which is engaged with a horizontally disposed lead screw 22 driven by a reversible servomotor 23 whereby the table 11 and the workpiece 13 thereon may be moved in $+Y$ or $-Y$ directions. To simplify the description which follows, only that part of the numerical control associated with the X and Y axis drive motors 21 and 23 will be illustrated. It will be understood by those skilled in the art, however, that such a control may be modified without departing from the scope of the invention to accommodate the third or Z axis servomotor 25 and indeed to control simultaneous motions along as many axes as might be desired.

Strictly speaking, in the machine 10 as shown, the cutter 14 moves along the X axis and the table 11 with the workpiece 13 moves along the Y axis. It is, however, the relative motion between the cutter and the workpiece which shapes the latter, and the same result would be obtained if the workpiece were stationary while the cutter moved along both X and Y axes. In the parlance of the art, therefore, the cutter 14 will here be referred to as the controlled member movable simultaneously along plural axes to follow a programmed path, and this is entirely correct when understood to refer to either the actual motions of the cutter or its motion relative to an associated part (workpiece).

The X and Y axis motors 21 and 23 form portions of X and Y axis servo systems which energize the motors with voltages proportional to the error between a commanded position and an actual position. To signal the actual positions of the cutter along the X and Y axes, feedback transducers here shown as rotary resolvers 27 and 28 are driven in unison with or geared relation to the lead screws 20 and 22. Their respective feedback signals are returned to servo amplifiers 29 and 30 which respectively receive the analog signal outputs of digital-to-analog converters (DAC's) 31, 32 and which in turn receive the changeable digital output signals of the numerical control contouring device 34, as shown in FIG. 1. The DAC's and the servo systems are so familiar to those skilled in the art that no further details need be given, except to note that the servo loops with relatively high gain serve to keep the X and Y position of the controlled member (cutter 14) dynamically in substantial agreement with the changing digital output signals XSC, YSC. The controlled member thus moves at axis velocities $V_x$ and $V_y$ corresponding to the rates of change of those signals XSC, YSC.

B. AN EXEMPLARY NUMERICAL CONTROL SYSTEM

For completeness the specifications and drawings in U.S. Pat. Nos. 3,656,124 and 3,727,191 (hereafter called Case A and Case B) are hereby incorporated by reference and made an integral part of the present disclosure. This will avoid the need for lengthly detail, and the brief review which follows will be framed with the assumption that the reader is familiar with Cases A and B.

Referring again to FIG. 1, the numerical control device 34 (sometimes called a "director") receives successive blocks of command signals which make up a "part program" defining a desired path which the member 14 is to travel. Each block of command signals defines one segment of the path, and the segments (which may be circular arcs or linear moves) are executed seriatim as the system responds to successive blocks. Although the blocks of command signals may be supplied successively from a part program static memory, the more conventional punched tape reader 35 is here illustrated as the source of such programmed command signals.

As each block of command signals is produced by the tape reader, the individual signals thereof are routed through a decoder 36 for entry into the memory or storage units of the director 34. The last-received block $B_{n+1}$ is held in buffer portions of the memory while the preceding block $B_n$, and signals derived therefrom, is held in active portions of the memory and utilized in the interpolation procedure to generate the changing servo input signals XSC, YSC. When active block $B_n$ has been fully executed, then the block $B_{n+1}$ is transferred to active memory and block $B_{n+2}$ is brought into buffer storage from the tape reader 35.

Associated and coupled with the director 34 is an operator's panel 38 which may include various warning indicators, control knobs and a manual data input (MDI) keyboard (not shown). Only those items pertinent to later portions of this description are illustrated in FIG. 1; they include a cycle start pushbutton switch CYSB, a feedhold pushbutton switch FHPS, a manual control direction selector joystick assembly 40 (containing several switches later to be described), and a jogging motion length selector switch 41. Additionally, the numerical control system of FIG. 1 includes a visual display unit 42 which indicates to the operator the value of one or more of the signals stored or created in the director 34. By setting a selector knob 44 on the panel 38, the operator may call up for display on the unit 42 any of the various signals then held (and even though they are dynamically changing) in the director 34. Since selectable visual displays are per se familiar to those skilled in the art, additional details are not required here.

Referring next to FIG. 5, two successive path segments $D_1$ and $D_2$ corresponding to command signal blocks $B_n$ and $B_{n+1}$ are shown to illustrate the basic geometric relationships. If it is assumed that the controlled member 14 is to be moved from point $P_1$ to point $P_2$ according to block $B_n$ and from point $P_2$ to point $P_3$ according to block $B_{n+1}$, and at a command path velocity or feed rate of F inches/minute, it becomes apparent that the member is to move from the coordinates $X_1$, $Y_1$ to coordinates $X_2$, $Y_2$ (by simultaneous movement along axis components $I_1$, $J_1$) and then to coordinates $X_3$, $Y_3$ (by simultaneous movement along axis components $I_2$, $J_2$). If the resultant path velocity is to be F, then the respective axis velocities $V_x$ and $V_y$ for the segment $D_1$ will be related such that $$V_x = F \cos \theta$$
$$V_y = F \sin \theta$$

where $$\theta = \tan^{-1}\frac{J_1}{I_1} = \cos^{-1}\frac{I_1}{D_1} = \sin^{-1}\frac{J_1}{D_1}$$

When the dynamically changing actual coordinates of the member 14 (or the signals supplied to the X and Y servos) become equal to $X_2$, $Y_2$ then the block $B_n$ segment $D_1$ is completed and the motion may be controlled according to the set of command signals for block $B_{n+1}$.

As explained more fully in Cases A and B, the director 34 (in one preferred form) measures off successive equal short time periods $\Delta T$ and iteratively computes and changes the servo command signals XSC and YSC by small amounts such that they appear to be continuously changing at a rate corresponding to the required axis velocities $V_x$ and $V_y$. To achieve this, a set of command signals for a given block need only directly or indirectly designate the components I and J for the segment length D and the desired path velocity F. Thus, as indicated by the data flow chart of FIG. 5A, the tape reader need only supply (for each block) X, Y, F and G signals which after decoding are held in buffer storage within the director 34. The block of command signals in buffer storage will be viewed as made up of signals XBUF, YBUF, FBUF, and GBUF in corresponding buffer storage registers.

Once a given block of command signals is in buffer storage, certain supplemental signals are derived therefrom prior to or at the time that block is transferred to active storage. That given block may be entered in either "absolute" or "incremental" form. That is, with reference to FIG. 5 and block $B_n$, the XBUF and YBUF numerical values may represent either the segment end point coordinates $XEP_2$, $YEP_2$ (absolute) or the axis components I, J (incremental). In the first case, the axis components are derived from the end point coordinates; in the second case the end point coordinates are derived from the axis components. The absolute or the incremental mode is indicated by a preparatory code (e.g., G90 or G91) in a well known fashion not here detailed, which causes the "processing" of a block of signals prior to transfer to active storage to be (see FIGS. 5 and 5A):

a. Absolute Format

XBUF and YBUF represent $XEP_2$ and $YEP_2$,
Therefore $$XEP_2 = XBUF \qquad (1)$$

$$YEP_2 = XBUF \qquad (2)$$

And $$I = XEP_2 - XEP_1 \qquad (3)$$

$$J = YEP_2 - YEP_1 \qquad (4)$$

b. Incremental Format

XBUF and YBUF represent I and J,
Therefore $$I = XBUF \qquad (5)$$

$$J = YBUF \qquad (6)$$

And $$XEP_2 = XEP_1 + I \qquad (7)$$

$$YEP_2 = YEP_1 + J \qquad (8)$$

As will be apparent from FIG. 5A, the numerical values of the starting coordinates $XEP_1$, $YEP_1$, for block $B_n$ (and which are the end point coordinates for the preceding block $B_{n-1}$) are held in active storage as the signals XEP, YEP when block $B_n$ is in the buffer location, so that the derivations set out above may be readily computed.

It really makes no difference to the system, therefore, whether any particular block of command signals is received in the absolute or the incemental format. In both cases, the block command signals directly or indirectly represent both the end point coordinates and the axis components. Since this feature is very well known per se in the art, no distinction between the two cases will be made in the present description. And, as indicated in FIG. 5A, the processing and transfer of a given block of signals from buffer to active storage results in storing of individual signals XEP, YEP, I and J—where XEP, YEP are the end point coordinates of the active block segment.

Further, as indicated in FIG. 5A, the buffer signals FBUF and GBUF are simply transferred to active locations where they are stored and designated F and G. But in addition, a time factor number TF is derived and stored. Changing signals ΔX, ΔY, XCP, YCP, XSC, YSC are produced in the active storage location by iterative computations for interpolation. This will be understood from Cases A and B, but may be summarized with reference to FIG. 5.

The director 34 contains a clock oscillator and frequency divider/counter for measuring off successive equal time periods ΔT of a selected short duration. For example, each ΔT period may be 20 milliseconds, or it may be chosen to be 32 milliseconds. For later use, it is desired to produce and signal a time factor number TF, where $$TF = \frac{\Delta T}{D} \qquad (9)$$

Since the values of I and J are signaled and available, and since $$D = \sqrt{I^2 + J^2} \qquad (10)$$

it is a simple matter to compute and store the time factor number by the computation $$TF = \frac{\Delta T}{\sqrt{I^2 + J^2}} \qquad (11)$$

where ΔT is a chosen constant representing the time period.

Now, if the resultant path movement D is to be effected at the path velocity F, then the path displacement ΔD per ΔT must be such that $$F = \frac{\Delta D}{\Delta T} \text{ and } \Delta D = F \cdot \Delta T \qquad (12)$$

To effect this, then the X and Y axis velocities must relate to the path velocity in the same way that the components I and J relate to the resultant D, and the distances ΔX and ΔY moved along the X and Y axes during each period ΔT are related to ΔD in the same ratios. That is, if the path "move" in each period ΔT is ΔD, then $$\Delta X = \Delta D \cos \theta \qquad (13)$$

$$\Delta Y = \Delta D \sin \theta \qquad (14)$$

To readily compute and store these values of ΔX and ΔY for any active block, simple multiplications are performed:

$$\Delta X = I \cdot F \cdot TF \qquad (15)$$

$$\Delta Y = J \cdot F \cdot TF \qquad (16)$$

From Equations (9) and (11), it will be seen that Equations (15) and (16) are tantamount to $$\Delta X = \frac{I}{D} \cdot F \cdot \Delta T = \cos\theta \cdot \Delta D \qquad (17)$$

$$\Delta Y = \frac{J}{D} \cdot F \cdot \Delta T = \sin\theta \cdot \Delta D \qquad (18)$$

and thus the relationships of Equations (13) and (14) are obtained.

As noted in Case B, Equations (15) and (16) are iteratively performed on a rapidly repeating basis, and with an actual velocity number FA (called PVA in Case B) rather than the path program velocity number F. This means that the actual velocity of the controlled member may be incrementally increased or decreased to accelerate or decelerate the controlled member 14 whenever the value of F changes abruptly upon transfer of a new block of command signals into active storage. Also, when the member 14 is to be stopped (decelerated to zero velocity), a control signal DTZ is created to cause the actual velocity number FA to reduce progressively to zero, so that ΔX and ΔY fall to zero and (as noted below) the servo input signals XSC and YSC cease to change. Because automatic deceleration to zero (DTZ) velocity is known in the art and described in Case B, it will suffice simply to note here that Equations (15) and (16) employed to signal the values of ΔX and ΔY permit the member 14 to be smoothly stopped by iterative computations which reduce the actual commanded velocity number FA (used in lieu of F) to zero.

With the values ΔX and ΔY available in active storage, target position or dynamically changing commanded position coordinate signals may be "updated" during each period ΔT to designate the X and Y axis positions which must be reached at the end of that period. As explained in Case A and Case B, this is an iterative computation process of interpolation, viz.

$$\text{Performed every period } \Delta T \begin{cases} XCP_i = XCP_{i-1} + \Delta X & (19) \\ YCP_i = YCP_{i-1} + \Delta Y & (20) \end{cases}$$

If when the controlled member is initially located at point $P_1$ (FIG. 5), the coordinate commands XCP and YCP have initial values equal to XEP₁ and YEP₁, then as successive periods ΔT are measured off, the coordinate commands will progressively change by amounts ΔX and ΔY per ΔT. The X and Y axis servo systems act to keep the X and Y actual positions of the member 14 dynamically in substantial agreement with the values of the coordinate command signals XCP and YCP.

As a practical matter, however, the feedback transducers 27 and 28 operate over small distance cyclic spans, so it is unnecessary to make the servo input signals have the full digit capacity of the target commands XCP, YCP. Thus, in a practical system, the latter signals are divided by the cyclic resolution of the feedback transducers and the remainder is utilized as the lesser digit servo input number signals XSC, YSC. That is:

$$XSC = \text{Remainder of Whole Division } \frac{XCP}{n} \quad (21)$$

$$YSC = \text{Remainder of Whole Division } \frac{YCP}{n} \quad (22)$$

where $n$ is the cyclic distance span of the transducers. This results nevertheless in the servo input signals changing by the amounts of ΔX and ΔY per period ΔT since XCP and YCP are so changed.

The numbers ΔX and ΔY are referred to as the axis "macromoves" in Cases A and B. As indicated there, the updating of the servo input numbers may be changed more frequently by "micromove" amounts to keep the servo tracking move dynamically accurate. Thus, if desired, this micromove updating may be performed by the iterative computations $$\text{Performed Every Period } \frac{\Delta T}{N} \begin{cases} XSC_i = XSC_{i-1} + \frac{\Delta X}{N} & (23) \\ YSC_i = YSC_{i-1} + \frac{\Delta Y}{N} & (24) \end{cases}$$

On the Nth microperiod, XSC and YSC are driven to be equal to the remainder specified by Equations (21) and (22) so that they are changed by amounds (ΔX/N), (ΔY/N) per (ΔT/N) and amounts ΔX, ΔY per ΔT. The micromove changing of the servo input signals is optional and fully explained in Case A, so it need not be considered further here.

From the foregoing and from Cases A and B, it will be seen that the target or commanded position signals XCP, YCP may be viewed, for all intents and purposes, as representing the actual coordinate positions at which the controlled member 14 resides (or will shortly reach) as the member is being moved along the path. Moreover, the macromove signals ΔX and ΔY may be viewed as being proportional to and indicating the axis velocities at which the member is moving. And, of course, when the signals XCP and YCP become equal to the end point signals XEP, YEP it is known that the path segment corresponding to the signal block in active storage has been fully executed.

Figure 6:
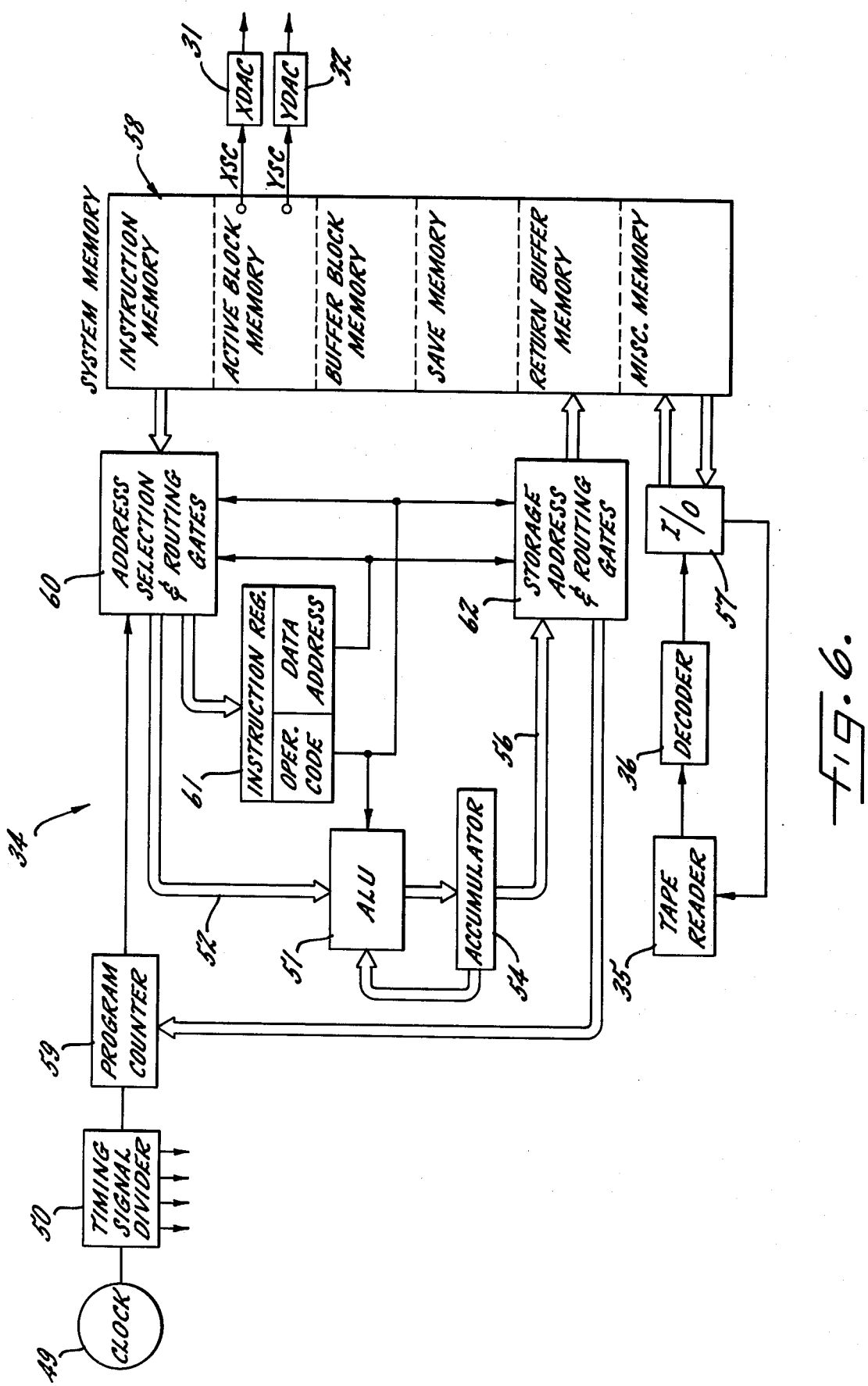
FIG. 6 is a diagrammatic block-and-line illustration of the one suitable form of the numerical control device with memory, such device appearing more generally in FIG. 1.
Figure 7:
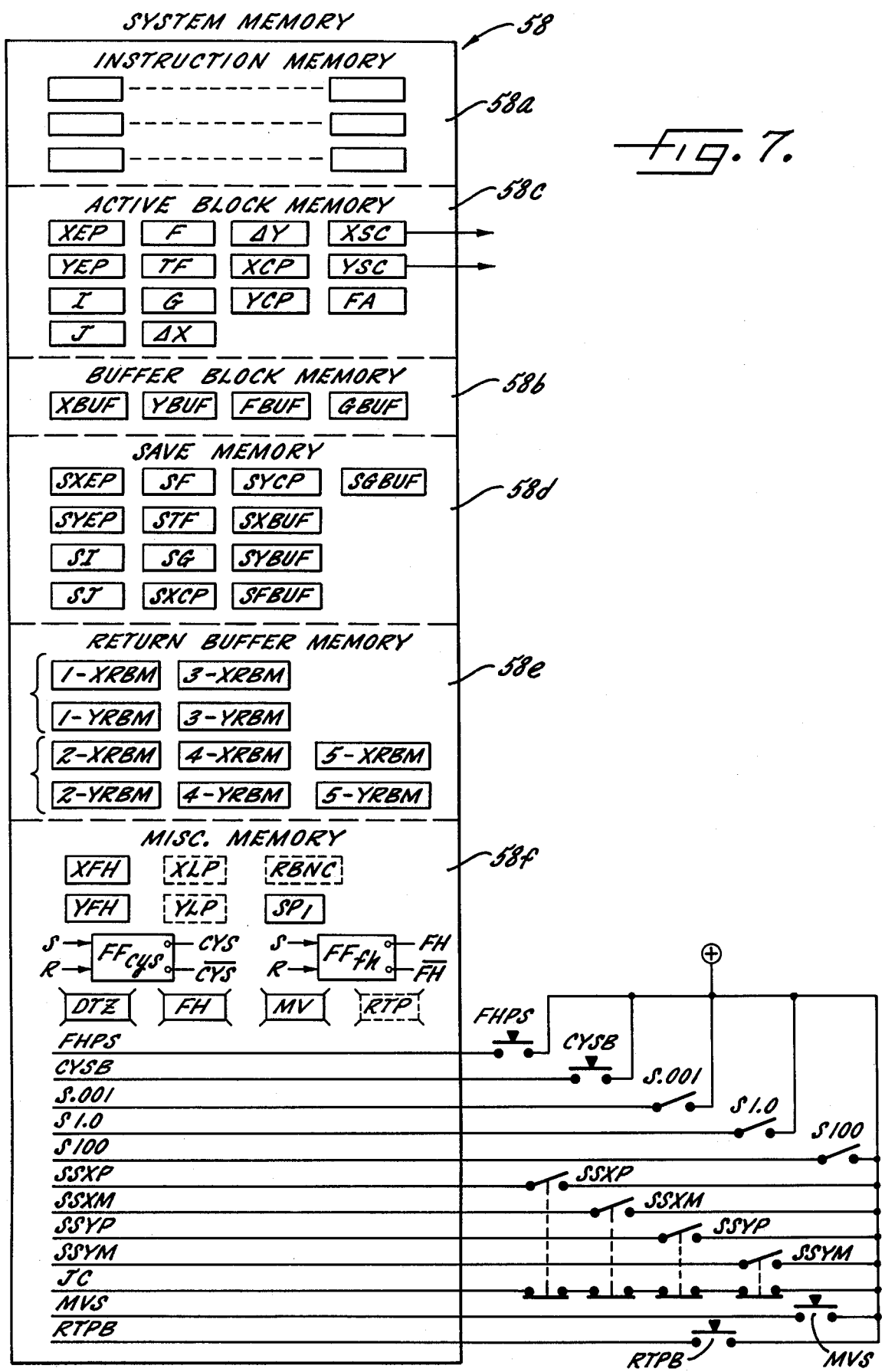
FIG. 7 is a block representation of the signal storing memory for the device of FIG. 6 showing in block form the storage units for those signals necessary to an understanding of preferred exemplary embodiments of the invention.

With the foregoing in mind, the general internal organization of the numerical control director 34 may now be considered with reference to a specific example. Although the director 34 may be constructed as an analog computer using dc. voltages to indicate signal values (and sample-and-hold circuits for memory), or as a hard-wired iterative computer programmed by its wiring connections (as specifically described in Case A and Case B), the example of FIGS. 6 and 7 illustrates the director 34 as a software-programmed digital computer. The internal construction details of such computers are well known to those skilled in the art, and any of a wide variety of computers currently available in the United States market may be chosen. As an example, the Hewlett-Packard Model 2100 digital computer has been used in one embodiment of the present invention.

By way of background, and as is well known, the computer includes a clock oscillator 49 which supplies pulses at a relatively high and constant frequency to a timing signal divider 50 which in turn sends timing signals to the other computer components so that elementary steps of fetching signals from memory, performing arithmetic operations, and storing the results are carried out in rapid sequence according to a stored master program of instructions. For this purpose the computer includes an arithmetic-logic unit (ALU) 51 served by an input trunk 52. An accumulator 54 receives the output from the ALU and transmits it over an output trunk 56. The output from the accumulator is sent back as an operand input to the ALU in certain arithmetic or comparing steps. These trunks are multiconductor wires which carry multi-bit signals representing in binary or BCD format numerical values of variables which change as a result of inputs from the tape reader 35 or computations performed by the ALU 51. The tape reader is coupled to the computer via the decoder 36 and an input/output interface 57.

The computer includes signal storage registers within a system "memory" 58 which functionally is divided into sections containing instruction words, active block data words, buffer block data words, "save" words, return buffer words, and miscellaneous words—all as explained more fully below. In simple terms, when the computer finishes execution of one "block" of active data previously read in from the tape reader 35, it transforms and transfers the next succeeding block from the buffer to active data section, and causes the tape reader 35 to start up and read the following block into buffer storage where it will be ready for subsequent use. The memory registers in the instructions section are set by reading in and storage of a "master program" to contain multibit words of instruction which designate the operations to be performed in sequence, with logic branching and interrupts. The instruction memory contains the master program and sets up the gates and controls of the general purpose minicomputer to convert it into a special purpose digital control apparatus, the pertinent portion of that program being described hereinafter.

Since the organization and operation of the digital computer is well known, it will suffice to observe briefly that advancement of a program counter 59 to an address number will cause selecting gates 60 to read the addressed memory instruction onto the input trunk and into an instruction register 61. The operation code in the latter is decoded and sent to the ALU to designate the operation to be next performed (e.g., add, subtract, complement, compare, etc.). It is herein assumed for ease of discussion, that the ALU receives an add instruction unless otherwise noted. The data address in the instruction register is transferred to and conditions the address selecting gates 60 to fetch from memory the data word next to be used as an operand, the multi-bit signals being sent via the trunk 52 to the input of the ALU. At the conclusion of an arithmetic or logic sequence, the result or answer appears in the accumulator 54 and is routed via the trunk 56 through storage address gates 62 to an appropriate location or register in the memory. The gates 62 are controlled by the data address output of the instruction register, so that an answer is sent for storage to the proper memory location, replacing any numeric signals previously there stored.

In a fashion familiar to those skilled in the art, the individual registers or memory locations may be designated by acronyms, and the quantity represented by the changeable number in any register may be designated by the same acronym. Each storage register or memory location thus constitutes a means for producing a given signal which can be changed in value by programmed computations or transfers effected by the ALU under control of the stored master program.

FIG. 7 is an expanded diagrammatic illustration of the computer memory, with the pertinent storage registers or locations having acronym labels to make clear how certain signals are created and utilized. The program instruction section 58a contains a very large number of instruction words which are formulated to cause orderly sequencing through the master program, with branching and interrupts. To avoid a mass of detail and yet fully explain the invention to those skilled in the art, the program instructions are not labeled in FIG. 7 but are set out in flow charts and listings to be described below.

The memory section 58b contains registers which hold the buffer block command signals. Although others (such as auxiliary M codes) not relevant here may be included, those buffer command signals, as noted above, are:

XBUF: The end coord. or I component of the path segment next to be executed.
YBUF: The end coord. or J component of the path segment next to be executed.
FBUF: The velocity or feed rate at which the next path segment is to be executed.
GBUF: The preparatory code to condition the system for linear or circular interpolation.

For simplicity, it will be assumed that a G01 code is always present (as contrasted with G02 and G03) so that the system functions by linear interpolation. The invention to be described, however, may be practiced with both the linear and the circular interpolation modes.

The memory section 58c contains those registers or locations holding signals constituting an active command block, as explained above with reference to FIG. 6. For ready reference these may be identified again:

XEP: The end X coordinate for the active block segment.
YEP: Same as XEP, except for Y axis.
I: The X axis component of the active block segment.
J: Same as I, except for Y axis.
F: The programmed path velocity for the active block segment.
FA: The path velocity actually being used for macromove computations.
TF: The computed time factor for the active block segment.
G: The G code for the active block segment.
ΔX: The last computed X axis macromove.
ΔY: The last computed Y axis macromove.
XCP: The last computed X axis commanded position coordinate.
YCP: The last computed Y axis commanded position coordinate.
XSC: The last computed X axis servo input signal.
YSC: The last computed Y axis servo input signal.

It will be seen from FIGS. 6 and 7 that the registers XSC and YSC send their signals as inputs to the servo systems, i.e., directly and continuously to the DAC's 31 and 32.

The memory section 58d comprises a plurality of registers or locations into which certain words or signals from the active and buffer sections may be transferred and "saved". The reasons for this will become clear below, and it will suffice to note presently that the "save" registers are designated by the prefix "S" and otherwise respectively correspond to the active signals XEP, YEP, I, J, F, TF, G, XCP, YCP and to the buffer signals XBUF, YBUF, FBUF, GBUF.

Also shown in FIG. 7 is a return buffer memory section 58e, the purpose of which will become clear when the third embodiment is hereafter described. It may be noted at this point, that the "return" section 58e includes registers for a predetermined number of pairs of numerical signals, each pair being identifiable by one of the numerical prefixes 1 through 5. They are used to hold the XBUF and YBUF signals for artifical or nonprogrammed blocks of command signals, as described below.

Finally, the memory section 58f includes registers or other devices to hold or signal various multi-bit or single bit numbers. The multi-bit numbers are XFH, YFH, XLP, YLP, RBNC and SP1—whose creation and significance will be set forth below. For the purpose of creating single bit logic control signals (having only "0" or "1" as possible values), two flip-flops $FF_{cys}$ and $FF_{fh}$ are shown. Strictly speaking these are physically external of the computer memory 58 but since they function as one-bit memory units, and are set or cleared (to create or remove signals CYS and FH) by the computer, they are illustrated as part of the memory. Further, one bit words or logic "flags" are here labeled DTZ, FH, MV and RTP. Each can be set to a "1" value or cleared to a "0" value, and as noted more fully below they are assigned the meanings:

DTZ: Decelerate to Zero Flag
FH: Feed Hold Flag
MV: Manually induced MOVE Flag
RTP: Return to Path Flag.

In addition certain switches, which are the sources of signals having "0" or "1" states, are "looked at" on a rapidly repeating time schedule established by the computer and its master program. Although these are not strictly "memory" devices, and are used in a "read only" sense, their output signals (e.g. 0 volts or +5 volts) are taken into the bus 52 via the selection gates 60 (FIG. 6) at certain steps of the master program sequence. Thus, those bi-state switch signals are for convenience here shown as existing in the memory so that they can be "read" into the computer.

As the first two of these, it will be seen that the signals FHPS or CYSB will reside at "1" levels when the feed hold switch FHPS or the cycle start switch CYSB (see FIG. 1) is closed, since those pushbutton switch contacts lead from a positive voltage source to corresponding conductors in the memory which the computer treats as one bit locations. It may be noted here that the return to path pushbutton switch RTPB appearing at the bottom of FIG. 7 is not shown physically on the operator's panel in FIG. 1, but such switch (used in the second and third embodiments) will be so physically located and, when actuated will produce the signal RTPB.

Figure 2:
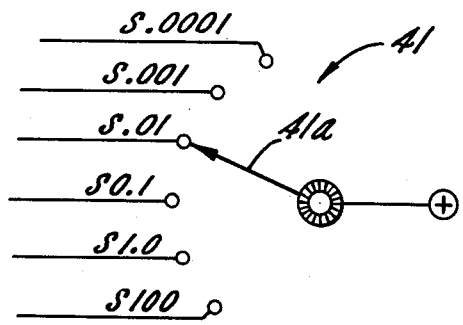
FIG. 2 is an electrical schematic representation of a jog distance selector switch which appears on the operator's panel in FIG. 1.

The remaining switches appearing in FIG. 7 are associated with the joystick assembly 40 and the selector 41 as they appear on the operator's panel 38 in FIG. 1. As indicated by FIG. 2, the selector switch 41 may be a simple indexable switch having a wiper 41a settable to engage any one of a plurality of contacts respectively labeled S. 0001, S. 001, S. 01, SO. 1, S1.0 and S100. By setting this switch, the operator may select the length of the X and/or Y incremental distance which he desires the member 14 to move under manual or "jogging" control, independently of the path program. When so positioned, the corresponding contacts will be closed to create a corresponding "1" signal designating an axis distance of 0.0001 inch, 0.001 inch, 0.01 inch, 0.1 inch, 1.0 inch or 100 inches. For simplicity, only the contacts for S. 001, S1.0 and S100 are shown in FIG. 7, to respectively create in the memory the signals correspondingly labeled.

Figure 3:
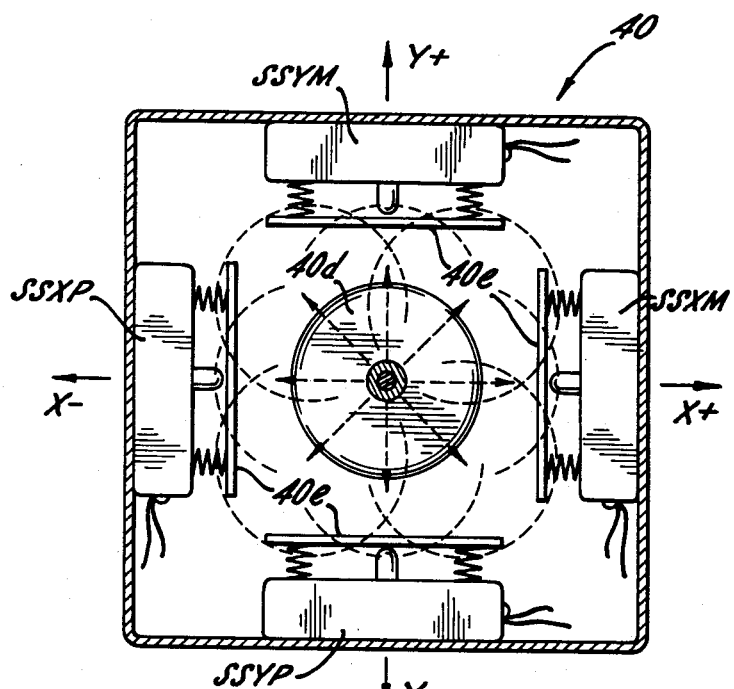
FIGS. 3 and 4 are diagrammatic, functional plan and side views of an operator's direction selection and jogging control lever assembly which appears with lesser detail on the operator's panel in FIG. 1.
Figure 4:
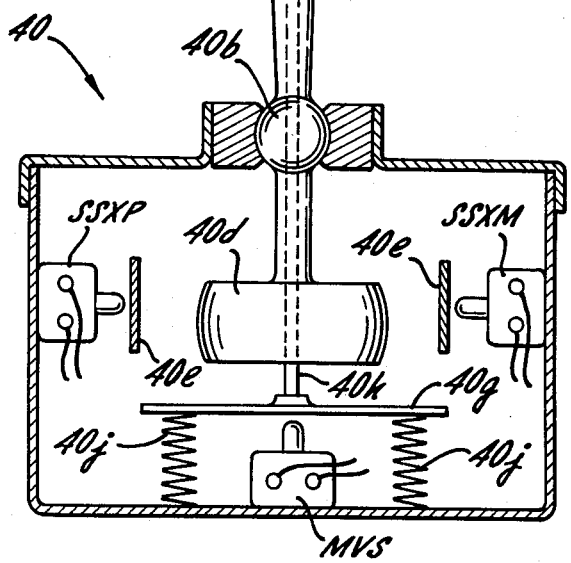

Having selected the "jogging" distance, the operator may next shift a pivoted joystick 40a to select the direction he desires the member 14 to move. As shown in FIGS. 3 and 4, the joystick 40a is universally pivoted at 40b in the assembly 40 but constrained so that the upper hand knob 40c may be moved right, left, up, down or right and up, right and down, left and up or left and down. Such shifting of the joystick from its centered position respectively calls for "jogging" motion to be in the $+X$, $-X$, $+Y$, $-Y$, $(+Y$ and $+X)$, $(+X$ and $-Y)$, $(-X$ and $+Y)$ or $(-X$ and $-Y)$ directions. The selections available are thus along either axis in a positive or negative sense, or along any of the four directions which lie at 45° to the axes. The lower portion of the joystick carries an enlarged disc 40d which leaves the outwardly biased switch actuator plates 40e (mounted on four microswitches) undeflected when the joystick plates 40e (mounted on four microswitches) undeflected when the joystick is centered. The four microswitches SSXP, SSXM, SSYP, SSYM are mounted at the level of the disc 40d with 90° spacing, each having an actuator pin 40f pushed inwardly when the associated actuator plate is depressed. When the disc 40d is moved directly to the right from its centered position, it shifts the actuator plate for and operates the switch SSXM; but when that disc shifted up and right (as viewed in FIG. 3) it operates two switches SSXM and SSYM. It will be apparent therefore that the following table (assuming that "up" in FIG. 3 is the $+Y$ direction) sets out the nine direction selector possibilities:

| If Operator Shifts Knob 40c | Switches Actuated | Direction Selected |
| --- | --- | --- |
| 0° | SSYP | +Y |
| 45° | SSXP, SSYP | +X, +Y |
| 90° | SSXP | +X |
| 135° | SSXP, SSYM | +X, −Y |
| 180° | SSYM | −Y |
| 225° | SSXM, SSYM | −X, −Y |
| 270° | SSXM | −X |
| 315° | SSXM, SSYP | −X, +Y |
| Center | NONE | NONE |

As shown in FIG. 7, each of the four microswitches has one normally open and one normally closed set of contacts. The normally open contacts lead individually from the positive voltage source and thus the switches will give the signals labeled SSXP, SSXM, SSYP, SSYM a "1" value in the memory when they are respectively actuated. The four normally closed contacts are connected in series from the voltage source to the memory line labeled JC, and therefore, the signal JC will be "1" so long as the joystick is centered, i.e., none of the four direction selector switches is actuated. If the computer looks at the signal JC and finds it to be "1" or "0", it knows that the joystick is, or is not, centered.

Finally, the joystick assembly 40 includes a "move switch" MVS mounted below an actuator plate 40g carried on a rod 40h slidably extending through the joystick and carrying a pushbutton 40i disposed in the center of the knob 40c. To initiate a selected jog motion, the operator may momentarily depress the button 40i to shift the plate 40g against the bias of springs 40j, thereby momentarily actuating switch MVS. As shown in FIG. 7 this creates a "1" level for the signal MVS in the computer memory.

C. THE MAIN PROGRAM

The master program which sets up the computer as a special purpose digital control device is, as noted above, prepared and read into the instruction section 85a of the memory 58. That master program may be viewed as comprising a main program and a feedhold subroutine. The main program is fully described in Cases A and B, and summarized above, so that the length and specific details thereof need not be repeated here. Either the director 34 can be constructed exactly like that described in Case B for hard-wired main program sequencing, or the hard-wire program set in Case B can be routinely translated into a soft-wired main program or instructions fed to memory section 58a in a fashion very familiar to those skilled in the art. In the latter case there is formed by the director 34, the servo systems and the motors 21 and 23 control means responsive to a block of command signals for moving the controlled member 14 simultaneously along plural axis and along a corresponding path segment defined by such signals. The tape reader 35 forms means for supplying successive ones of a path program of blocks of command signals to the control means to make the member 14 move seriatim through the successive segments of the programmed path. In the operation of the system, each block of command signals when it is transferred into active memory results in iterative computations to generate axis macromove signals $\Delta X$ and $\Delta Y$ which are added during each of successive equal periods $\Delta T$ to position coordinate signals XCP, YCP and to servo input signals XSC, YSC. With the controlled member 14 tracking the changing values of XCP, YCP, when the latter become equal to the command block end points XEP, YEP, the next block of command signals is brought automatically into active memory, and the procedure continues for the next path segment. Moreover, as fully described in Case B, any condition or switch closure which sets a signal DTZ to "1" will cause the macromove signals to progressively decrease to zero, bringing the member's velocity to zero so that the signals XCP, YCP cease to change and the member is stopped until the DTZ signal is cleared.

D. A FIRST EMBODIMENT

To create a first embodiment of the improvement which constitutes the present invention, the master program as prepared and fed into the instruction memory 58a includes a subroutine which is entered in response to a timed interrupt generated at frequent intervals, e.g., every 32 milliseconds. This improvement, and the physical apparatus so created may be fully, clearly and concisely explained to one skilled in the art by reference to the subroutine flow chart in FIGS. 8A, B, C and the program listing in Table I (which for ready reference is located at the end of this specification). Since the flow chart and the Table I listing are in large measure self-explanatory, a description of the apparatus as it is created by the main program and the subroutine program may best proceed as a narrative of the sequential steps and operations which are carried out.

Referring to FIG. 8A and Table I, it may be assumed that the computer in the director 34 is iteratively cycling through its main program. As the clock produces a timed interrupt signal (say, every 32 milliseconds), the subroutine program is entered. Due to the speed of the computer, the subroutine is completed in a very short time when its exit is reached, and the main program is resumed. The subroutine cycle differs under various conditions, each of which will be treated briefly below.

D(1) A Cycle Prior To Starting of a Part Program

The operations to carry out a part program are initiated by the operator momentarily depressing the cycle start switch CYSB which in trun sets (by means in the main program) the cycle start flip-flop $FF_{cys}$. Thus, under the conditions here assumed, that flip-flop is reset and the one bit signal CYS is 0.

As the subroutine is entered at step 001, the signal CYS is read into the cleared accumulator which then holds a zero, so the program counter is jumped immediately to step 009 (see Table I). The signal FH is then brought into the cleared accumulator, found to be zero (because $FF_{fh}$ is in the rest state). Thus, the system jumps to the exit (at step 122) and returns to the main program.

D(2) A Cycle When the Member Is Being Moved Normally Along the Path

After the cycle start switch CYST is momentarily closed, and the flip-flop $FF_{cys}$ is set, the main program will cause the controlled member to advance along a path segment, and through successive segments seriatim, as previously explained. Under these conditions the feedhold switch FHPS will be open and the flip-flop $FF_{fh}$ will be in a reset state.

In the execution of step 001 (FIG. 8A and Table I) the signal CYS will be found to be 1, but at step 002 the signal FHPS (see FIG. 7) will be found to be 0—so the system jumps to step 004, puts signal FH in the accumulator, finds it to be 0, and therefore jumps to the EXIT.

D(3) A Cycle Initially Finding the Feedhold Switch Closed

It is virtually impossible for the machine operator to press the feedhold push-button switch in a fashion that its contacts will be closed less than 32 milliseconds, i.e., such that the signal produced by the feedhold switch is not detected by the computer. Thus, if the main program is performing normal execution of a part program and the controlled member 14 is moving along any segment of the programmed path (and therefore the cycle start $FF_{cys}$ is in a set state), the subroutine cycle proceeds in the following fashion.

In response to an interrupt pulse and entry at step 100, the flip-flop $FF_{cys}$ is found in a set state and the system proceeds to step 002. Thereupon, if the operator has only momentarily depressed the push-button switch FHPS, the signal FHPS read from memory on step 002 (see FIGS. 7, 8A and Table I), has a "1" value, and the system thus proceeds to step 003—where a "1" signal is sent to the setting input terminal of the flip-flop $FF_{fh}$, placing the latter in the set state. Thereafter, when the signal FH is read during step 004, it is found to be "1", and the system does not exit (as previously) but proceeds to step 005 where a "1" is sent for storage at DTZ, i.e., the DTZ FLAG is set. This conditions the main program (as noted in Case B) such that the X and Y axis velocities will be gradually reduced and the controlled member 14 decelerated to zero velocity and stopped. Such deceleration to zero may occur over the span of several iterations of the main program.

In order to determine when the deceleration to zero has been completed and that the controlled member has actually stopped on the path, the signaled quantities $\Delta X$ and $\Delta Y$ are sensed during steps 006 and 007 to see if both have been reduced to a zero value. As noted in Table I, this involves reading in the stored signal $\Delta X$ on step 006; and then if the accumulator answer is zero the system proceeds to step 007, but if the accumulator answer is not zero the system jumps to the subroutine exit at step 122. On step 007, the signal $\Delta Y$ is read into the cleared accumulator. If the answer in the accumulator is zero, the system proceeds to step 008, but if the answer is not zero, the system jumps to the exit at step 122. Therefore, if either $\Delta X$ or $\Delta Y$ is not zero (as is true while deceleration is taking place following feedhold switch actuation), the system simply completes the subroutine cycle by exiting to the main program. This completes the cycle when the closure of the feedhold switch FHPS is first detected. The feedhold flip-flop $FF_{fh}$ is now set to "remember" that a feedhold mode has been initiated.

D(4) A Cycle Through the Subroutine During the Time When the Controlled Member is Decelerating to a Stop on the Path Similar and relative short cycles through the subroutine program take place while the main program is decelerating the controlled member 14 to a stop in response to the previous actuation of the feedhold switch (which caused setting of the DTZ FLAG). That is, upon entry at step 001 in response to an interrupt pulse, the system proceeds from step 001 to step 002 where the feedhold switch FHPS may be found either closed or open. In the former case, a setting signal is supplied to $FF_{fh}$ on step 003, but this is redundant because the flip-flop is already in its set state. In the second case, the system jumps from step 002 to 004. At step 004 the flip-flop $FH_{fh}$ is now found in its set state, the system proceeds to step 005 at which the previously set DTZ FLAG is again redundantly set (with no harm), after which the system executed steps 006 and 007. Again, if the member has not yet fully stopped, but still is in the process of decelerating to zero velocity on the path, either of the quantities $\Delta X$ or $\Delta Y$ will be found to have a value other than zero, and the subroutine is terminated by exit to the main program. Repeated cycles of this nature through the subroutine may occur until such time as the controlled member has indeed stopped and the quantities $\Delta X$ and $\Delta Y$ are both found to be zero.

D(5) A Subroutine Cycle First Finding the Member Stopped on the Path in Response to the Feedhold Signal Let it be assumed now that the deceleration has just been completed and that the member 14 has come to zero velocity at a random stopping point on the programmed path. When an interrupt pulse results in entry of the subroutine at step 001, the system progresses to step 006 in the same fashion as described immediately above. At steps 006 and 007, however, both of the quantities ΔX and ΔY are found to be zero, so the system proceeds to step 008 at which a "1" signal is supplied to the reset terminal of the flip-flop $FF_{cys}$, thereby placing the latter in its reset state and removing the "cycle start" status of the whole system.

Thereafter, the system jumps from 008 to 010 where the value of the feedhold flag FH FLAG is sensed. This flag is used to modify the progress through the subroutine the first time after the controlled member has been stopped in response to a feedhold switch actuation, as contrasted to subsequent passes through the subroutine. Since the FH FLAG is at this point not set, i.e., stores a value of 0, the system goes on to steps 011 through 038.

In keeping with an important aspect of the present improvement, provision is made to store or save the blocks of command signals for the programmed path which are then in both the active and the buffer memory sections. It is for this reason that the "save" memory section is utilized. As indicated in FIG. 8A and Table I, a series of signal transfers are performed at steps 011 through 038 to memory registers or locations which are designated by the prefix "S". Thus, for example, the then-existing active block signals XCP and YCP are transferred to locations SXCP and SYCP during steps 011 through 014. In like manner, the signals I, J, XEP, YEP, TF, F, G, XBUF, YBUF, FBUF and GBUF are transferred to "save" locations. Although it is not necessary in the first embodiment here being described, the signals XCP and YCP are also transferred to saving locations designated XLP and YLP, as shown in FIG. 8A and Table I at steps 035 through 038. The purpose of these saving operations will become clear in the later description of the third embodiment.

It will be apparent that since the controlled member has just come to a stop at some random point on the path, the signals XCP and YCP which are transferred to SXCP and SYCP represent the coordinates of the member 14 residing in its stopping point. The other saved signals generally are kept so that they can be recalled and reused when the system later is to resume normal progress of the member 14 along the path from its present stopping point.

After the saving operations are completed at step 038, the system proceeds to steps 039 through 043 which are performed to clear all of the buffer memory section, i.e., to write zero values into the XBUF, YBUF, FBUF and GBUF registers. This prepares these registers to receive a block of signals representing an artificial segment, i.e., a non-part program block of signals. The clearing of the register RBNC is pertinent only with respect to the third embodiment, and can be ignored for the moment.

At step 044, a 1 is written into the single bit FH FLAG memory which thereafter indicates that the saving and buffer clearing operations have been completed once after the member 14 has stopped in response to actuation of the feedhold switch.

In keeping with one aspect of the present invention, the control apparatus here described includes means for producing signals which dynamically represent the distance between the stopping point on the path and any location to which the controlled member 14 is subsequently moved by manual jogging operations. For this purpose, the XFH and YFH memory registers are employed, and on steps 045 through 051 they are filled with signals representing the difference between the stopping point coordinates (now signaled in SXCP and SYCP) and the present location coordinates of the movable member. The subtractions and storing indicated by equations at steps 045-050 in FIG. 8A (and detailed in Table I) are thus performed during every cycle through the subroutine after the member has been stopped in response to actuation of the feedhold switch. The signals XFH and YFH thus always represent the axis component displacements of the controlled member from the path stopping point.

In the subroutine cycle presently being described, the saved quantities SXCP and SYCP will be equal to the presently existing values of the member's axis coordinates XCP and YCP. Thus, the signaled numbers XFH and YFH will at this point in time have zero values when they are stored.

The system next proceeds to step 051 where these stored axis component departures XFH and YFH are examined to determine if they both have zero values. The details of the procedure is set out at steps 051 and 052 in Table I, where it is indicated that if both displacement values are not zero, the system jumps to step 086; but otherwise the system proceeds to step 053. In the present cycle, therefore, the system will proceed to step 053, find cycle start switch CYSB open (signal CYSB = 0), and therefore jump to step 086 where it is determined if the operator's manual control selector joystick is in its centered position.

Since the controlled member has just previously come to a feedhold stop, it may be assumed that during the present subroutine cycle the joystick 40a (FIG. 4) is in its centered position. The signal JC (FIG. 7) is 1. Thus, in performing step 086, the system jumps to step 109.

At step 109 (FIG. 8B and Table I) the DTZ FLAG is set. This is redundant since such flag was previously set, but the redundancy does no harm. Then, at steps 110 and 111, the ΔX and ΔY quantities are examined to see if both are zero, in the same manner as described previously with respect to steps 006 and 007. In the present cycle through the subroutine, the quantities ΔX and ΔY have been and will be found both equal to zero, so that the system proceeds to steps 112 through 115 where the presently existing quantities of XCP and YCP are transferred respectively to the XEP and YEP registers. It is to be noted that this sets the values of XEP and YEP in the active memory section to quantities which represent the coordinates of the stopping point on the path because at this point in time the values of XCP and YCP represent the coordinates of that stopping point.

Thereafter, at step 116 the DTZ FLAG is cleared by writing 0 therein; and the system jumps to step 121 where move flag MV FLAG is cleared by writing 0 therein. The latter operation is redundantly harmless since the move flag MV at this point in time is in a zero state.

From step 121, the system proceeds to step 122 where it exits to the main program. The controlled member 14 has now been brought to a halt at a random stopping point on the path, the blocks of command signals previously in active and buffer storage have been saved in the save memory sections, and the axis coordinates of the stopping point have been placed in the XEP, YEP as well as the SXCP, SYCP and the SXEP, SYEP memory locations.

D(6) A Cycle With the Member Stopped on the Path

When the next interrupt pulse appears, the performance of step 001 will find the flip-flop $FF_{cys}$ in its reset state (the signal CYS to be 0). Therefore, the system will immediately jump from step 001 to step 009 where it will find the flip-flop $FF_{fh}$ set and the signal FH to be 1. Thereafter the system proceeds to step 010 where the value stored in FH FLAG will now be found to be 1 (having been set during the previous cycle at step 044), so that the system jumps to step 045. Steps 045 through 050 will be performed, as described above, to compute and store the current values of the feedhold displacements XFH and YFH. Since the member is still resting at the stopping point on path, these latter values will be zero.

Then, at step 051, the values of XFH and YFH are examined and found both to be zero (as previously described) so the system proceeds to step 053, finds switch CYSB open, and skips to step 086. Here the signal JC is found to be 1 (as previously described) so the system jumps to step 109 where the DTZ FLAG is set. Next at step 110 the values of the stored signals $\Delta X$ and $\Delta Y$ are found both to be zero, so the system proceeds to step 112 and the two transfers previously described are redundantly performed, resulting in no change of the previously stored values for XEP and YEP. At step 116, the DTZ FLAG is cleared and the system jumps to step 121 where the MV FLAG is redundantly cleared, after which the subroutine cycle is completed.

Subroutine cycles of this type will occur over and over so long as the operator does not cause the controlled member to move away from a stopping point on the path by manual jogging control.

D(7) A Subroutine Cycle Initially Finding a Manual Move Requested

The human machine operator may manually control movement of the member 14 away from the path after it has been brought to a feedhold stop. He does this by selecting the axis component distance which he wishes the member to move simply by setting the wiper 41a for the switch 41 (FIG. 2) to one of its several possible positions. It is assumed that the switch 41 must always be in one of those positions. Moreover, merely for the sake of brevity, it has been assumed in preparing FIG. 8B and Table I that the jog distance selector switch 41 has only three possible positions, i.e., that designating 0.001 inch, that designating 1.0 inch or that designating 100 inches. The reader will readily understand how FIG. 8B and Table I may be expanded to accommodate all or more of the several positions which are shown in FIG. 2 for the switch 41.

Incidentally, an axis jog distance of 100 inches is actually longer than one might consider to be a "jog". By selecting this long displacement, the operator really intends to move the controlled member more or less continuously until he decides to interrupt its motion; and he can so interrupt the motion at any time by shifting the selector joystick 40a from its direction-selecting position to its centered position, as hereinafter noted.

Having set the switch 41, the operator next deflects the joystick 40a from its centered position to any of the eight direction-selecting positions previously described. Having so selected the desired direction of manually controlled movement, the operator initiates the "move" momentarily depressing the "move button" 40i (FIG. 4) so as to momentarily close the move switch MVS. It is the detection of this momentary closure of the move switch contacts (and the appearance of a "1" for the signal MVS in the memory, FIG. 7) which starts the sequence of operations to move the member in the selected direction and for the selected axis distances (unless the joystick is recentered prior to full movement through the selected axis distances). It will be recalled that any such manually selected jogging move will be along either the X or the Y axis or at 45° relative to such axes.

Consider now FIGS. 8A, B, C and Table I with the assumption that the selector switch 41 is in the S1.0 position and that the joystick 40a has been shifted to call for movement positively along the X axis. This means the switches S1.0 and SSXP are closed. Assume further that the move switch MVS has just been momentarily actuated. As the subroutine is entered at step 011, operations proceed as described above under the heading D(6) until step 086 is reached. During step 086, the signal JC is found to be 0, so the system proceeds to step 087 where the signal MVS is found to be 1 (because the switch MVS is closed). Thus, the system proceeds to step 088 where the stored bit in the MV FLAG is read into the cleared accumulator and found to be 0, after which the system proceeds to step 089 and a 1 is set into the move flag, MV FLAG. The move flag is employed to signal that a move has been initiated; it stays on until a manually initiated move is completed.

At step 090, the signal S.001 is read from memory and found to be 0 because, with the assumption that switch S1.0 is closed, switch S .001 must be open. Therefore, there is a jump from step 090 to step 092 where the signal S1.0 is drawn from memory and found to have a "1" value. The system thus proceeds to step 093 where numerical value of 1.0 is read into storage at scratch pad register SP1. The system then jumps to step 095. A moment's study of steps 090 through 094 as set out in FIG. 8B and Table I will reveal that the distance increment selected by the switch 41 is placed in scratch pad SP1.

Beginning at step 095, the direction selecting switches are examined and appropriate signal transfers to the X and Y buffer registers are made to define the selected jog segment. More specifically at step 095 (see also FIG. 8C), the signal SSXP is read into the cleared accumulator. If that signal is a 1, the number in SP1 is transferred to XBUF on step 096. But on the other hand, if SSXP were found to be 0, the system would jump to step 098 where it looks at the signal SSXM; if the latter is 1, the system proceeds to step 099 and transfers the SP1 number as a negative value of XBUF. But if SSXM is 0, the system skips to step 101. With the assumptions stated above, the switch SSXP is found closed, so that during the present cycle through the subroutine, step 095 results in the performance of step 096 where the number SP1 (here assumed to be 1.0) is transferred to XBUF.

In a similar fashion, the signals SSYP and SSYM are examined in steps 101 through 106 and the selected jog increment distance is transferred either as a positive or a negative number from SP1 into the YBUF memory register. With the assumptions stated above, both of the switches SSYP and SSYM will be found open, so that the system merely advances from step 101 to 104 to 107 without transferring a numerical value into the previously cleared YBUF register.

Thereafter, at step 107, the numerical value of 01 is written into the register GBUF so as to designate that the non-program (or artificial) command block being formed in the buffer memory section is to be performed by linear (rather than circular) interpolation. Next, at step 108, the numerical value 100 is written into the FBUF register so as to call for a feed rate of 100 inches per minute in the artificial block of command signals. After step 108, the system jumps to step 122 and exits for return to the main program.

D(8) A Cycle While a Manually Controlled Move is Being Executed

Since the four buffer memory section registers have now been filled with non-zero numbers which collectively constitute a command block of signals (but which are artificial in the sense that they have not come from the source of part program block command signals), and since the current values of XCP and YCP are respectively equal to the current values of XEP and YEP, the main program will process the buffer signal into a corresponding set of signals in the active memory section. Thus, new values of ΔX and ΔY will be computed and stored, and the target coordinate signals XCP and YCP will be iteratively updated. The servo systems will be energized and the member 14 will move away from its previous stopping point on the path. It will move in the direction selected and (after acceleration) at a feed rate of 100 inches per minute. In the process of transferring the block of command signals in buffer storage to the active storage section, new values of end point corrdinates XEP and YEP will be created and stored (according to Equations 7 and 8, supra), so that movement of the member will normally proceed until such time as the values of XCP and YCP become equal to the now-signaled end point coordinates XEP, YEP. In the course of normally approaching and stopping at the end points XEP and YEP, the main program will cause setting of the DTZ flag and deceleration of the controlled member to zero velocity at those end point coordinates.

While the foregoing is happening, the subroutine will be entered in response to each interrupt pulse. Thus, there may be several cycles through the subroutine of FIGS. 8A, B, C and Table I during an extended time interval while the manual move is being executed. A typical such cycle will now be described.

Upon entry at step 001, the subroutine will proceed through step 009, 010, and thence through steps 045–050 as previously described. At steps 051, 052 it will be found that the feedhold displacements XFH and YFH are not both zero because the computations at steps 045–050 now find that XCP and/or YCP are different from the stopping point coordinates SXCP and SYCP. Therefore, the system jumps from step 051 or 052 to step 086, bypassing the step 053 at which the "cycle start" signal CYSB is examined. As noted below and in keeping with an important feature of the invention, the switch CYSB and its signals are effectively disabled so long as the movable member is displaced from the stopping point on the path, and this is determined by detecting that either (or both) of the displacement signals XFH and YFH is not zero.

At step 086, however, the joystick 40a will be found in its non-centered position, and the signal JC will be O, so the system proceeds to step 087. It may be assumed that by this time the switch MVS is open (the signal MVC is O) so that the system skips from 087 to 117. But if the switch MVS should still be closed (because the operator has depressed it for a relatively long time) and the signal MVS is still 1 the system will go through step 088, find the MV FLAG on, and thus jump to step 117.

At steps 117 through 120, the presently existing values of XCP and YCP are compared with the presently existing values of XEP and YEP, respectively. This is done as shown in Table I by subtracting XEP from XCP to see if the result is zero, and subtracting YEP from YCP to see if the result is zero. When these pairs of signals become equal to one another, it is known that the member is executing a manual move under the operation of the main program has reached and stopped at the desired end point of that manual move. In so stopping, the DTZ FLAG is set by the main program.

For the subroutine cycle presently being described, it is assumed that the member 14 is still moving along the segment which has been manually selected and initiated by the operator. Thus, from either step 118 or step 120 (Table I) the system jumps to step 122 to exit from the subroutine cycle and return to the main program. Th identical sequences of operations for cycles through the subroutine will continue over and over until such time as the operations at steps 117–120 signify that the end point of the manually initiated move has been reached. And when such end point is reached, the member's velocity will be zero because of deceleration produced by the main program.

D(9) A Subroutine Cycle Which Ends a Manual Move

After a number of cycles through the subroutine as described under the heading D(8) above, there will come a time when the subroutine proceeds as there described down to steps 117 through 120 and during which it is found that XCP = XEP and YCP = YEP. When this occurs, the system proceeds to step 120a to again sense the condition of the move switch MVS. This is done to prevent the apparatus from repeating a manually selected move if the operator should still be holding switch MVS closed when the manual move is completed. He must release that switch and then close it after one manual move ends in order to initiate the next manual move. If at step 120a, the switch MVS is closed, the system exits; but assuming that the signal MVS is O, it proceeds to step 121 and clears the MV FLAG. Thereafter, at step 122 the system exits for return to the main program. By clearing the MV FLAG, the apparatus is conditioned to indicate that the manually initiated jogging move has been completed, and so that another manually initiated move may be started and executed in the same fashion described. At the end of each such manual move, the signaled values of XCP and YCP, as well as those for XEP and YEP, represent the axis coordinates of the actual location (displaced from the path stopping point) in which the controlled member 14 then resides. Moreover, the signals XFH and YFH represent the axis displacements from the path stopping point to the member's location.

D(10) A Cycle Wherein a Manual Move is Terminated Prematurely By Centering the Joystick As mentioned above, any manual move may be terminated prematurely if the operator simply shifts the joystick back to its centered position while that move is in progress. While the member 14 is progressing along a manual move and subroutine cycles are proceeding according to the sequence described under the heading D(8) above, the operator may at any time simply center the joystick and convert the signal JC from 0 to 1. A subroutine cycle in which this is first detected may now be described.

When the subroutine is entered at step 001 in response to an interrupt pulse, the sequences of operations proceed as described above under the heading D(8) until the step 086 is reached. At step 086, the signal JC is found to be 1, so that the system skips to step 109 where the DTZ FLAG is set. This conditions the apparatus so that the main program will thereafter cause the movable member to decelerate to zero and stop at some random point short of the normal end point for the operator-initiated manual move. From step 109, the system proceeds to steps 110 through 111 and there determines whether or not the movable member has come to a halt. It does this, as described above, by sensing the values of $\Delta X$ and $\Delta Y$ and determining whether or not both are equal to zero. In the present subroutine cycle it is assumed that the joystick 40a has just been centered, so that $\Delta X$ and $\Delta Y$ are not both zero. Therefore, the system jumps from step 110 or 11 to the exit, and returns to the main program.

As the main program proceeds through several successive iterations, the values of $\Delta X$ and $\Delta Y$ will be progressively reduced toward zero. As the subroutine is entered several times in these circumstances, either $\Delta X$ or $\Delta Y$ will be found to have a value other than zero at steps 110 and 111, so that the system will simply exit and return again to the main program.

When, however, the member has been brought to a halt due to the centering of the joystick, then the next cycle through the subroutine will result in $\Delta X$ and $\Delta Y$ being zero during steps 110 and 111, so that the system will proceed to steps 112 through 115, transferring the present values of XCP and YCP into the XEP and YEP registers. Thus, the end point signals XEP and YEP are made equal to the halting point of the member when a manually initiated move is prematurely interrupted, and this conditions the system as if a shorter manual move had been called for by the operator and completed.

Thereafter at step 116 the DTZ flag is cleared (because the controlled member has stopped after deceleration to zero velocity); and at step 121 the MV FLAG is cleared, whereupon the cycle is complete and the system exits to the main program.

D(11) Assuring the Return to Path Stopping Point Before Restarting Normal Path Operation As explained above, actuation of the feedhold switch may bring the controlled member to zero velocity at any random stopping point along the path, and thereafter the machine operator may select and initiate as many successive manual jogging moves as he might desire. Each move will be in a positive or negative direction along the X or Y axis or at one of the 45° directions relative to the two axes. Any manually initiated jogging move may be prematurely interrupted. This latter feature will be utilized primarily when the jog increment of 100 inches is selected and the operator wishes to stop the movable member at some location part way along that move by centering the joystick.

Figure 9:
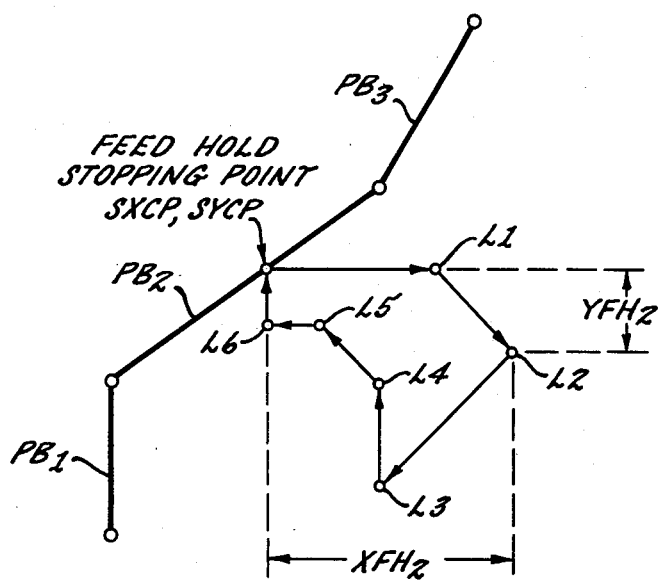
FIGS. 9, 10 and 11 are diagrams showing typical movements of a controlled member as effected by operation of the first, second and third embodiments, respectively.

Referring to FIG. 9, it may be assumed that the part program path which is originally being executed calls for automatic sequential movement of the controlled member 14 along path block segments $PB_1$, $PB_2$ and $PB_3$. It may further be assumed that while the member has been moving along the segment $PB_2$, the operator has depressed the feedhold switch FHPS so that the member has decelerated and stopped at a path stopping point here designated SXCP, SYCP. FIG. 9 further illustrates several manually initiated jogging movements, a first from the stopping point to a displaced location L1, and thereafter a 45° move from location L1 to location L2.

As each stopping displaced location (L1 or L2) is reached, signals are stored and available to represent the (i) coordinates of the path stopping point — as held in the SXCP and SYCP registers, and (ii) the coordinates of the member's position — as held in the registers XCP and YCP. Means are provided to compare (in effect, continuously) the two sets of coordinates and to indicate whether or not they agree. Such comparing means are created by the conditioning of instruction registers so that on steps 045-050 the differences XFH and YFH are computed as SXCP-XCP and SYCP14 YCP; plus conditioned instruction registers to perform the operations of steps 051, 052 to determine if those differences XFH and YFH are both zero. If so, the stopping point coordinates and the member's actual position are identical.

It will be recalled from what has been said above that as the controlled member moves away from the path stopping point, the computed and stored displacement signals XFH and YFH are dynamically changed (see steps 045-051) so as always to reflect the axis component displacements from the path stopping point to the then actual location of the member. Thus, when the controlled member has been displaced under manual control to the location L2 in FIG. 9, the values of the stored signals XFH and YFH represent the axis component displacements which are labeled $XFH_2$ and $YFH_2$ in FIG. 9. That is, there are here provided means for creating signals XFH and YFH which directly or indirectly represent the axis component displacements between (i) the path stopping point and (ii) the actual location of the member after each manually initiated move away from the stopping point.

Further according to the present invention, means are provided for producing a restart signal, such means here being exemplified by the cycle start switch CYSB, and the signals CYSB which it produces when momentarily closed. And means are responsive to the restart signal for restoring the numerical control system to normal sequential operation, but the latter are associated with means controlled by the displacement signaling means for disabling the restarting of normal sequential operations unless and until the displacement signals are reduced substantially to zero. Viewed in another sense, the restarting of normal sequential operations is prevented unless a comparison of the stopping point coordinate signals with the actual location coordinates reveals them to be the same.

Figure 8B:
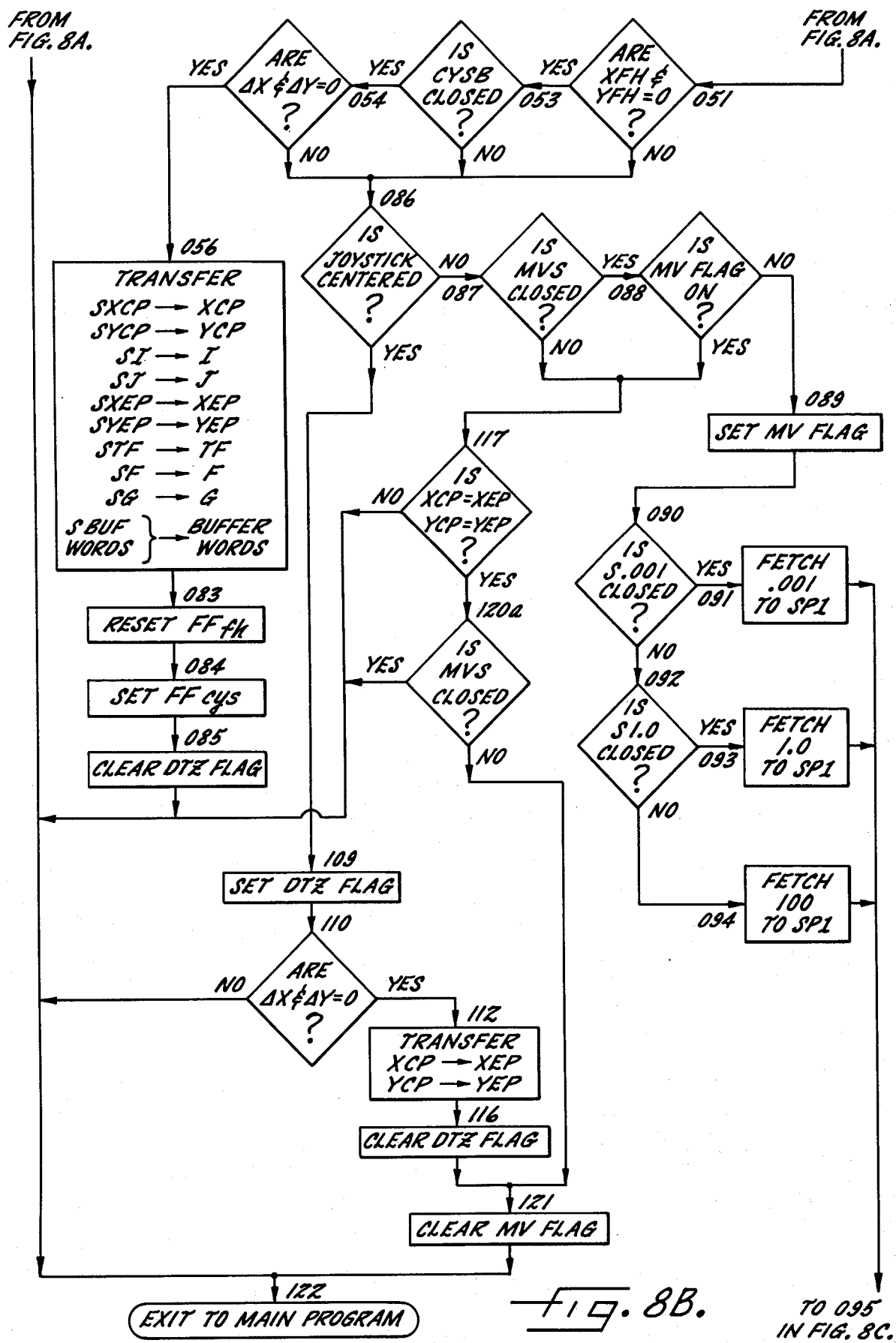

More specifically, it may be noted from FIG. 8B that at steps 051 and 052 the displacement signals XFH and YFH are examined to determine if both are equal to zero. If not, then the step 053 is bypassed, and any closure of the cycle start switch CYSB (with the corresponding value of 1 for the signal CYSB) will be ineffective. If closure of the cycle start switch CYSB is deemed to produce a "restart signal", this can have no effect whatever, and there can also be no attempt to resume normal path operation, until the operator has first returned the movable member to its original stopping point on the path. If the operator forgets to return the member to the path stopping point by manual control, he cannot cause any damage to the machine or the workpiece because his actuation of the cycle start switch CYSB will simply produce no result whatever.

Referring again to FIG. 9, when the member 14 has been displaced to location L2 (or indeed at anytime when the member 14 is displaced from the path stopping point), the operator may adjust the display selector switch 44 (FIG. 1) so that the values of the displacement numbers XFH and YFH are visually observable upon the display device 42. With the member at location L2, the values of those signals as so displayed will represent the displacement distances XFH2, YFH2. Thereafter, the operator may by manipulation of the selector switch 41, the joystick 40a and the move switch MVS, cause the member to execute further manual moves to locations L3, L4, L5 and L6. By moving the member to location L3, for example, the operator may make it more convenient to inspect or change the cutting tool, or to measure or inspect the workpiece. After such duties have been performed, the operator may proceed with the manual moves to L4, L5 and L6 in order to make the controlled member move back toward the path stopping point SXCP, SYCP. He is aided significantly in this by observing the visual display device 42, since both the displacements and the direction of the displacements from the stopping point are accurately shown (as the values XFH and YFH) there at all times. He can judiciously select the distances and directions of the successively smaller moves which he manually initiates. With the member 14 at location L6, and by observing the displacement XFH and YFH on the display device 42, the operator may create a final manually controlled short jogging motion which takes the controlled member 14 precisely back to the path stopping point. The operator will be apprised when the stopping point is reached because the values of XFH and YFH as they appear on the display device 42 will be zero. And when this is achieved, the system will be enabled so that it can respond to momentary closure of the cycle start which CYSB in order to restore the system to normal iterative motions along the programmed path. The operator need only momentarily depress the CYSB switch and normal path operation will be resumed.

More specifically, let it be assumed that the displacement signals XFH and YFH have both been restored to zero and that the operator has just momentarily depressed the cycle start switch. When the next interrupt pulse appears, the system will proceed through the subroutine of FIGS. 8A, B, C and Table I from steps 001 to 009, 010, thence 045–050 (where XFH and YFH will be stored as zero values). Then at steps 051, 052 both XFH and YFH will be found to have zero values, and the system will proceed to step 053 where the signal CYSB will be found to be 1 (because switch CYSB is closed). Only under these conditions does the system ever enter step 054 and proceed with restarting of the apparatus for continued movement of the member 14 along the path. At steps 054, 055, the ΔX and ΔY signals are examined to see if they are now both of "0" value, since it is conceivable that at a given instant the controlled member may be at the stopping point but still moving. This might occur if the operator made the last jogging motion for intended return to the path too long so that some overshoot beyond the stopping point occurs. In this event, the system jumps from step 054 or step 055 to step 086 and continues through the subroutine in one of the sequences described above. But if both ΔX and ΔY are found to be zero at steps 054, 055 then the system proceeds to step 056 and thereafter performs the operations necessary to restart motion of the member 14 along the path from the original random stopping point.

More specifically, at steps 056 through 082 all of the originally "saved" signals are transferred from the save memory section back to the respective active and buffer memory sections shown in FIG. 7. Inspection of steps 056 through 082 will reveal that they represent the reverse of the transfer operations which were described earlier with respect to steps 011 through 038. Therefore, the active and buffer stored data are returned to the original values they had when the member earlier stopped on the path. Moreover, at step 083 the feedhold flip-flop is set. Then at step 084 the cycle start flip-flop $FF_{cys}$ is reset. And at step 085 the DTZ FLAG is cleared, after which the system exits to the main program. This restores the system completely to a normal running condition with signal CYS = 1 and signal FH = 0.

As the main program thereafter proceeds, new and correct values of ΔX and ΔY will be generated, and the restored values of XCP and YCP will be iteratively updated by ΔX and ΔY amounts — so that the controlled member moves from the stopping point along the path toward the end point coordinates XEP, YEP of the path segment previously interrupted.

E. A SECOND EMBODIMENT

The present invention may be practiced in various specific embodiments. FIG. 8Ba when substituted for FIG. 8B and taken with FIGS. 8A and 8C (and portions of FIG. 8B) forms a flow chart for a second embodiment. The second embodiment flow chart is to be read in conjunction with the program listing of Table II which appears at the end portion of the present specification for convenient reference. In the second embodiment of the invention, restarting of the numerical control system into normal sequential operation for movement of the member along the programmed path is disabled when the member has been moved under manual control away from the path stopping point, until such time as the member is restored precisely to the path stopping point. But there is the further refinement in the second embodiment that a restart signal produced by the operator momentarily closing a push-button switch will cause the controlled member automatically to move from any displaced location back to the path stopping point, and then to resume its motion along the path segment which was interrupted.

Again, the second embodiment of the invention may best be described by a narrative sequence of the operations which occur to produce cycles of different types through the subroutine program as it is set out in FIGS. 8A, 8Ba and 8C together with Table II. It may be observed initially that subroutine cycles for the second embodiment under the conditions stated in the headings D(1), D(2), D(3), D(4) above will be exactly the same, since it is primarily the subroutine program steps reflected in FIG. 8A which determine those subroutine sequences. Table II indicates that the subroutine steps 001 and 050 for the second embodiment are the same as those listed in Table I. Therefore, the description of the second embodiment may be considered to carry out cycle types E(1), E(2), E(3), E(4) as described above at D(1), D(2), D(3), D(4); and the description may begin with treatment of the subroutine cycle which transpires immediately after the control member 14 has, in response to a feedhold signal, been brought to a halt at a random stopping point on the path.

E(5) A Cycle Immediately After Stopping On the Path

As reflected in Table II and FIG. 8A, when a feedhold signal has resulted in the controlled member coming to a complete stop on the path, the subroutine steps 001 through 050 are executed in the same fashion as described under the heading D(5) above. By way of review, the subroutine is entered at step 001 and proceeds via steps 002, 004, 005, 006, 007 and 008 (FIG. 8A), the latter step resulting in resetting of the flip-flop $FF_{cys}$ so that the numerical control system is taken out of its normal operation mode for producing motion of the member 14 along the programmed path.

From step 008, there is a jump to step 010 at which the FH FLAG is found to be 0, so that the system proceeds through the transferring operations of steps 011 through 038. In this way, all of the pertinent data signals in the active and buffer memory sections are transferred to the saving memory section so that they can be retrieved and utilized later. The system then proceeds through steps 039-043 to clear the buffer memory registers, and at step 044 sets the FH FLAG. During steps 045 through 050, the component displacement signals XFH and YFH are computed and stored (as previously described), but under the assumed conditions that the member has just come to a halt at a random stopping point on the path, these signals will presently have values of zero.

According to the second embodiment (FIGS. 8Ba and Table II), the system thereafter proceeds to step 051 to examine the signal JC. It is assumed that the joystick is now centered so the signal JC will be 1 and the system will proceed to step 052 where the RTP FLAG 2 will be found to be 0. The manner in which the RTP FLAG is set and reset will become apparent below.

From step 052 the system proceeds to steps 053-054a in order to determine whether or not the member has reached the end point then represented by the signals XEP, YEP. Since it has been assumed that the member has just stopped (as found at steps 006, 007 illustrated in FIG. 8A), the XEP, YEP signals represent the end point of the interrupted path segment, and the signals XCP, YCP represent the path stopping point. Thus, inequality of the compared signals will be found, and the system jumps from 053a or 054a to step 121. At step 121 the DTZ FLAG is set. This has no effect since the member is already at zero velocity. At step 122 the values of the ΔX and ΔY signals are sensed to determine if the member's velocity is zero, and since this is found to be true, the system proceeds through steps 124-127. In consequence, the currently existing values for the signals XCP and YCP are transferred respectively into the XEP and YEP registers, making it appear as if the member has been stopped at the end point of a path program block. That is, all four such signals now represent the axis coordinates for the path stopping point at which the member presently resides.

Thereafter, the DTZ FLAG is cleared on step 128, the MV FLAG is redundantly cleared on step 129, and at step 130 the RTP FLAG is redundantly cleared. Upon reaching step 131, the system exists from the subroutine back to the main program and the cycle is finished.

On the very next cycle, the comparison of coordinates on steps 053-054a will find equality because XEP, YEP were driven to equal XCP, YCP during the previous execution of steps 124-127. Therefore, step 055 will be performed to sense the RTPB switch, but assuming it to be open, the system will then jump to step 121. Cycles of this type proceed over and over so long as the number remains stopped on the path.

The "return to path" switch RTPB is, in effect, a restart switch location on the operator's panel. Although not separately illustrated on that panel in FIG. 1, this switch is of a character like the cycle start switch CYSB, and indeed the latter may be designated as the "return to path" switch in this second embodiment. It will be seen that this particular cycle sequence is very similar to that described above under the heading D(5).

E(6) A Cycle With The Member Stopped on the Path

After the initial subroutine cycle executed immediately after the member has stopped on the path, the member may remain at that location for a considerable period of time. Yet, the subroutine will be entered many times in response to interrupt pulses. Each cycle through the subroutine in these circumstances will result in the same sequential operations as described under the heading E(5) except that the cycle start flip-flop $FF_{cys}$ will not be found in its reset state and the FH FLAG will now be found on. Thus, the sequences are exactly the same except that there is a jump from step 001 to step 009 where the feedhold flip-flop $FF_{fh}$ is found set so that the system proceeds to step 010 where the FH FLAG is found on, thereby making the system jump to step 045. From that point onward the sequence is the same as designated under E(5) above, excepting only that from steps 053-054a the step 055 is performed to find switch RTPB open, so there is a jump to step 121.

E(7) A Cycle Initially Finding a Manual Move Requested

It has been explained above how the operator may set the increment selector switch 41 and the joystick 40a to select the distance and the direction for a desired manually induced move of the member 14. The move is actually started as a consequence of the operator momentarily closing the move switch MVS. In the subroutine cycle here to be treated, therefore, it will be assumed that the latter switch is first found to be closed.

Under these assumed conditions, the subroutine sequence will proceed exactly as described above under E(6) down to step 051. Now the joystick will be found non-centered, and the signal JC will be 0. Thus, the system jumps from step 051 to step 064 where the signal MVS (see FIG. 7) will be found to be 1, so that the system proceeds to step 065 and senses the MV FLAG. Since the MV FLAG is now 0, the system proceeds to step 066 where the MV FLAG is set to hold a 1. As noted in Table II, the subroutine cycle then proceeds from program step 066 through 085 which are respectively identical to the program steps 089 through 108 designates for the first embodiment in FIGS. 8B and 8C taken with Table I. For the sake of brevity these steps will not be again detailed here. It will thus be understood that in proceeding from steps 066 to 085 and thereafter jumping to the exit at step 131, the second embodiment (like the first) creates and transfers into the buffer memory registers an artificial block of command signals which define the direction and distance of the manual move which the operator has selected and initiated. When the system exits to the main program, that artificial block of command signals is processed and transferred to the active memory section so that the member begins moving away from the stopping point on the path in the same fashion as detailed earlier with respect to the first embodiment.

E(8) A Cycle in Which a Manually Controlled Move is Being Executed

Once a manually controlled move has been initiated by a subroutine cycle as described at E(7), the subroutine will be entered many times during the time interval that the member is moving along the manually induced segment. Each such cycle through the subroutine may be described as follows.

When the subroutine is entered at step 001 in response to an interrupt pulse, the sequences are the same as those described above under the heading E(7) until step 064 is reached. At step 064 the move switch MVS will be found open, or at step 065 (if the move switch is still closed) the MV FLAG will be found on. Therefore the system in either case will skip to steps 086–089 at which (in a fashion described earlier) a determination is made as to whether the movable member has reached the end point of the manually selected move. This is done by operations which determine whether or not the updated target coordinates XCP and YCP have become respectively equal to the end point coordinate values XEP and YEP. Since under the assumed conditions, the manual move is still being executed, this comparison will reveal inequality and thus the system will jump from step 087 or 089 to step 131 where it exits and returns to the main program.

E(9) A Cycle Which Finds the Manual Move Completed

As cycles of the E(8) type are repeatedly performed, there will come a time when at step 086 the values of XCP and YCP will be found equal respectively to XEP and YEP. Thereupon, the system proceeds to step 090 to find the RTP FLAG off. Thereafter, at step 090a, if the move switch MVS is found still to be closed, there is a jump to the exit at 131 to prevent repetition of the just-executed manual move. But assuming it is found that signal MVS is 0, the system jumps to step 129 where the MV FLAG is cleared, and proceeds through step 130 where the RTP FLAG is redundantly driven to 0. Thereafter, the system exits and returns to the main program. It will be noted that at this instant, the values of XCP, YCP and XEP, YEP represent the axis coordinates of the controlled member's location at some point displaced from the stopping point on the path.

E(10) A Cycle in Which a Manual Move is Prematurely Terminated

As stated earlier, if the joystick 40a is centered while a manual move is in progress, the member 14 is immediately decelerated to a stop before the manual move is completed. If it is assumed, therefore, that a type E(8) cycle is in progress but that the joystick has just been shifted to its centered position, the subroutine sequence will proceed as described under E(6) and E(8) down to step 051. Since the signal JC is now 1, the system does not jump to step 064 but proceeds to step 052 and thence through steps 053, 053a, 054, 054a. Since under the assumed conditions, the member is moving along a manually selected segment, the values of XCP and YCP will not be respectively equal to XEP and YEP. The system jumps to step 121. At the latter step the DTZ FLAG is set, thereby conditioning the main program to decelerate the member to a stop before it reaches a normal end point for the manually selected segment. From step 121, the system proceeds to steps 122, 123 and finds that $\Delta X$ and $\Delta Y$ are not both zero, so that there is a jump to step 131 and an exit back to the main program.

Several such cycles will be executed while the member 14 is being decelerated to a stop. Ultimately, however, during one of such cycles the operations performed at steps 122, 123 will find that $\Delta X$ and $\Delta Y$ are both zero (i.e., that the member has fully stopped), so the system will proceed to steps 124–127 during which the current values of the member's location coordinates XCP and YCP are transferred into the XEP and YEP registers. Thereafter at step 128 the DTZ FLAG is cleared and the system proceeds through step 129 to clear the MV FLAG, goes through step 130 redundantly and exits at step 131.

Whether a manually initiated jogging move is terminated in a normal fashion by reaching the desired end of that move, or is prematurely terminated by centering of the joystick, its actual location is reflected by the coordinate signals XCP, YCP as well as the end point coordinate signals XEP, YEP.

E(11) A Cycle With the Member stopped at Any Location Displaced From the Stopping Point As noted earlier, once the member has been brought to a feedhold stop at a random stopping point on the path, the operator may call for as many successive jogging moves as he might desire. The member, therefore, travels away from the stopping point in successive moves which are selected and controlled by the operator, but comes to a halt at some location displaced from the stopping point after each such move. With the member so stopped in a location displaced from the stopping point, it may remain there for a considerable period of time while the operator performs desired functions such as inspection or changing of the cutter, or measuring and inspection of a workpiece. The subroutine will be entered many times in response to interrupt pulses while the member is so stopped. The sequences through the subroutine will be precisely the same as those described above for an E(6) type cycle excepting that the values of the axis component displacement signals XFH and YFH will not be zero and indeed will represent the X and Y axis distances from the member's present location back to the original stopping point on the path. This will be understood more clearly from FIG. 10 which indicates that after the member has been stopped at point SXCP, SYCP on the path segment $PB_2$, it has been manually jogged away to a first location L1, then jogged through a second manual move to location L2, and then jogged to a third location L3. When in the latter location, the values of the displacement signals XFH and YFH will represent the axis component distances labeled $XFH_3$ and $YFH_3$ in FIG. 10.

E(12) Assuring Return to the Path Stopping Point Before Restarting Normal Operations In keeping with the invention, the numerical control system cannot be restarted into normal sequential operation unless and until the member is first restored to its original stopping point on the path. To prevent the operator from attempting such restarting of the system into normal path sequencing, and indeed to relieve the operator of all worries about remembering to return the member and manipulating the member back to the stopping point, the second embodiment is organized such that a momentary restart signal created by the operator actuating a push-button causes the member to return automatically to the stopping point and thereafter automatically to resume its normal motion along the programmed path. These results obtain in response to momentary closure of the "return to path" switch RTPB which creates a restart signal, i.e., make the signal RTPB momentarily equal to "1".

Figure 10:
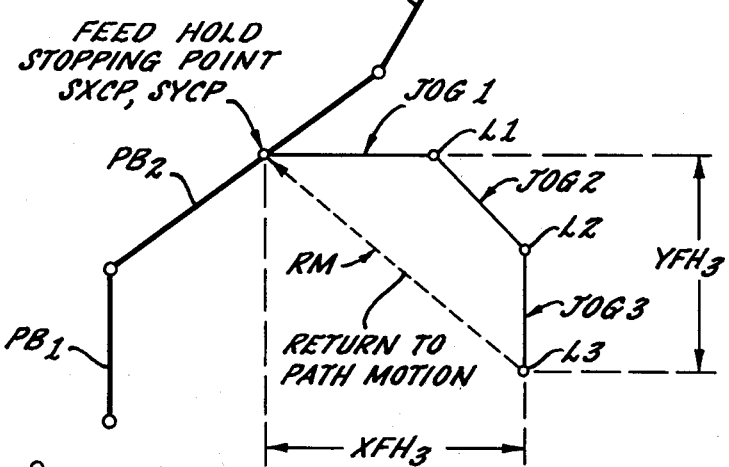

In greater detail, let it be assumed that the member 14 has been manually jogged to the location L3 shown in FIG. 10, and that the operator then momentarily depresses the push-button switch RTPB. Thus, in the progress through the subroutine of FIGS. 8A, 8B*a* and 8C taken with Table II, that switch will be found closed, and modified sequence of operations will result, as now described.

When the subroutine is entered in response to an interrupt pulse at step 011, the operations proceed as described under E(6) and E(11) down to step 052 (FIG. 8B*a*). The RTP FLAG is found to hold 0 so the system proceeds to steps 053–054*a* to find XCP = XEP and YCP = YEP, and thereupon reaches step 055. At this point in time, the RTPB switch is closed, and the signal RTPB as labeled in FIG. 7 is 1. Thus, the system does not jump from step 055 (as heretofore described) but proceeds to steps 056 through 062 where the indicated transfer operations are performed. That is, the signals XFH and YFH are respectively transferred to XBUF and YBUF — thereby setting into buffer memory values representing the axis component distances labeled XFH$_3$ and YFH$_3$ in FIG. 10. Also, the feed rate of the interrupted path segment now represented by the signal SF is transferred to FBUF, and an 01 code is transferred to GBUF. This establishes a full "artificial" block of command signals in the buffer memory defining the move RM required to return the controlled member directly from its existing location L3 (FIG. 10) to the path stopping point SXCP, SYCP.

Following these transfers, the system proceeds to step 063 where the RTP flag is set to signify that a "return to path" move RM has now been called for and will be in progress. From step 063 the system jumps to step 131 and exits to the main program.

With the command block data now in the buffer memory section, the main program processes it into corresponding active data signals (as previously described above and in Case B) so that new values of ΔX and ΔY are created and the target coordinate signals XCP, YCP are iteratively updated. In the process of converting the buffer data into active data, the end point signals XEP, YEP are given values which represent the original stopping point coordinates SXCP, SYCP. Therefore, as the main program is repeated over and over several times the controlled member begins moving from location L3 (FIG. 10) along the segment RM toward the original stopping point. It will continue such movement until the main program effects an automatic deceleration to zero and halting of the member precisely at the original path stopping point SXCP, SYCP.

E(13) A Cycle While the Member is Returning

While the member is moving back toward the path, the subroutine of FIGS. 8A, 8B*a* and 8C taken with Table II will be entered many times. The sequence of one such cycle is set out below.

When the subroutine is entered at step 001, the operations proceed as described previously under E(6) and E(11) down to step 052. Here the RTP FLAG is now found on, so the system jumps to step 086 and compares the current values of XCP and YCP with the end point values XEP and YEP during steps 086–089. With the assumption that the member is traveling along the return move RM shown in FIG. 10, and recalling that the values of XEP, YEP now represent the path stopping point coordinates SXCP, SYCP, steps 086 through 089 will result in a determination that XCP and YCP are not respectively equal to XEP and YEP. Therefore, the system jumps from step 089 to step 131 and exits to the main program.

Such a cycle will occur over and over while the return move RM is being executed.

E(14) The Cycle Finding That the Member Has Returned to the Path Stopping Point As subroutine cycles of the E(13) type are repeatedly executed, there will come a time when the member 14 reaches the coordinates SXCP, SYCP shown in FIG. 10, and the values of XCP, YCP become equal to those stopping point coordinates as now signaled by the values of XEP and YEP. Therefore, when steps 086 through 089 are reached and performed, the two equalities will be found to exist, and the system will proceed to step 090. Here the RTP FLAG is sensed and found on so that the system proceeds to step 091. In the performance of steps 091 through 117, all of the numerical signals located in the save memory section 58*d* are returned to the corresponding locations in the buffer and active memory sections. Steps 091 through 117 in FIG. 8B*a* corresponds exactly to steps 056 through 082 in FIG. 8B and Table I, and thus need not be described in detail again. It may be noted only that all of the active and buffer data are restored to the values which they had when the controlled member 14 was first brought to a halt at a random stopping point on the path in response to a feedhold signal.

Thereafter, the system proceeds through steps 118, 119 and 120 as shown in FIG. 8B*a*. As previously described in connection with the first embodiment, these steps result in resetting of the flip-flop FF$_{fh}$ to indicate that the feedhold condition is now ended, and setting of the flip-flop FF$_{cjs}$ to restore the system to a normal sequential running mode with the member moving along the original programmed path segment. In step 120, the DTZ FLAG (previously set in the main program) is cleared and the system exits at step 131.

The next cycle through the subroutine will be exactly as described at D(2) above, i.e., from 001, 002 to 004, to exit at 131. Moreover, with the transferring of the saved data back to the active and buffer memory sections, the member is accelerated and begins moving along the path segment which was previously interrupted by the feedhold signal. In the example of FIG. 10, the member is moving away from the point SXCP, SYCP along segment PB$_2$ toward the latter's end point. It will be appreciated that the return path from any displaced location, and the restarting of the motion along the path is completely automatic after a restart signal has been created by momentary closure of the operator's push-button switch RTPB.

F. A THIRD EMBODIMENT

By operation of the second embodiment described above, the member 14 returns directly and automatically to the path by the most direct route (see FIG. 10). In certain types of controlled machines or machine tools, there may be fixtures or machine components which the operator must "jog around" in order to move the member 14 to a desired location displaced from the path stopping point. In such applications a direct, automatic return to the path could result in damaging collisions with such fixtures or components.

A third embodiment of the invention may be constructed to make the member 14 return to the path from any given displaced location, but via the same route chosen by the operator to move the member (in one or more manual moves) away from the path. This overcomes the collision possibility present in certain types of machines or applications.

Figure 8C:
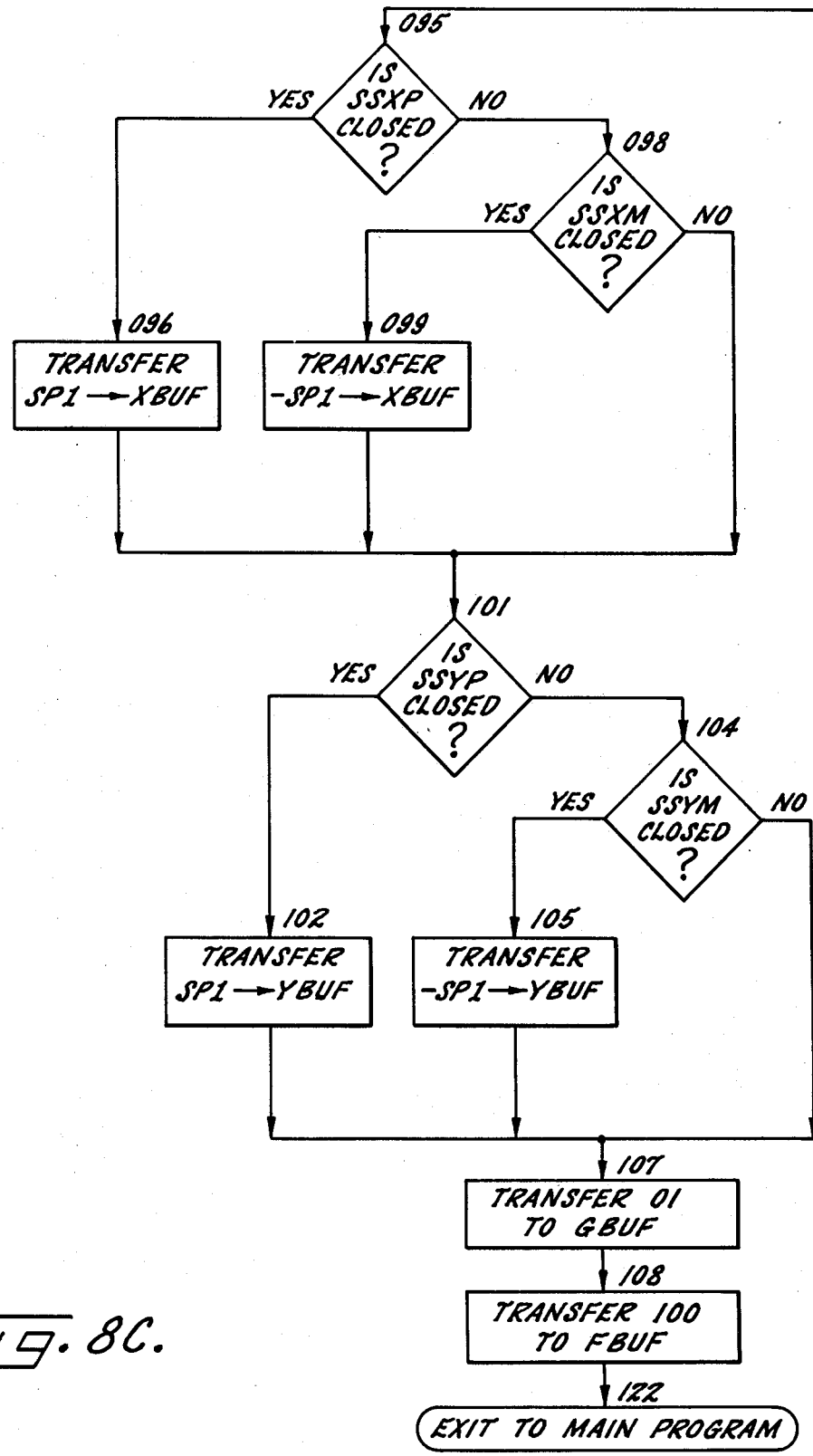

FIG. 8B*b* taken with FIGS. 8A and 8C (and portions of FIG. 8B) form a flow chart which, in conjunction with the listing of Table III (located for convenient reference at the end of this description), sets out fully an alternative subroutine instruction program fed to the numerical control system to construct and condition the same as a third embodiment. Again, this can best be described as a narrative of the sequences which occur in cycles through the subroutine under different particular conditions.

Figure 8B:
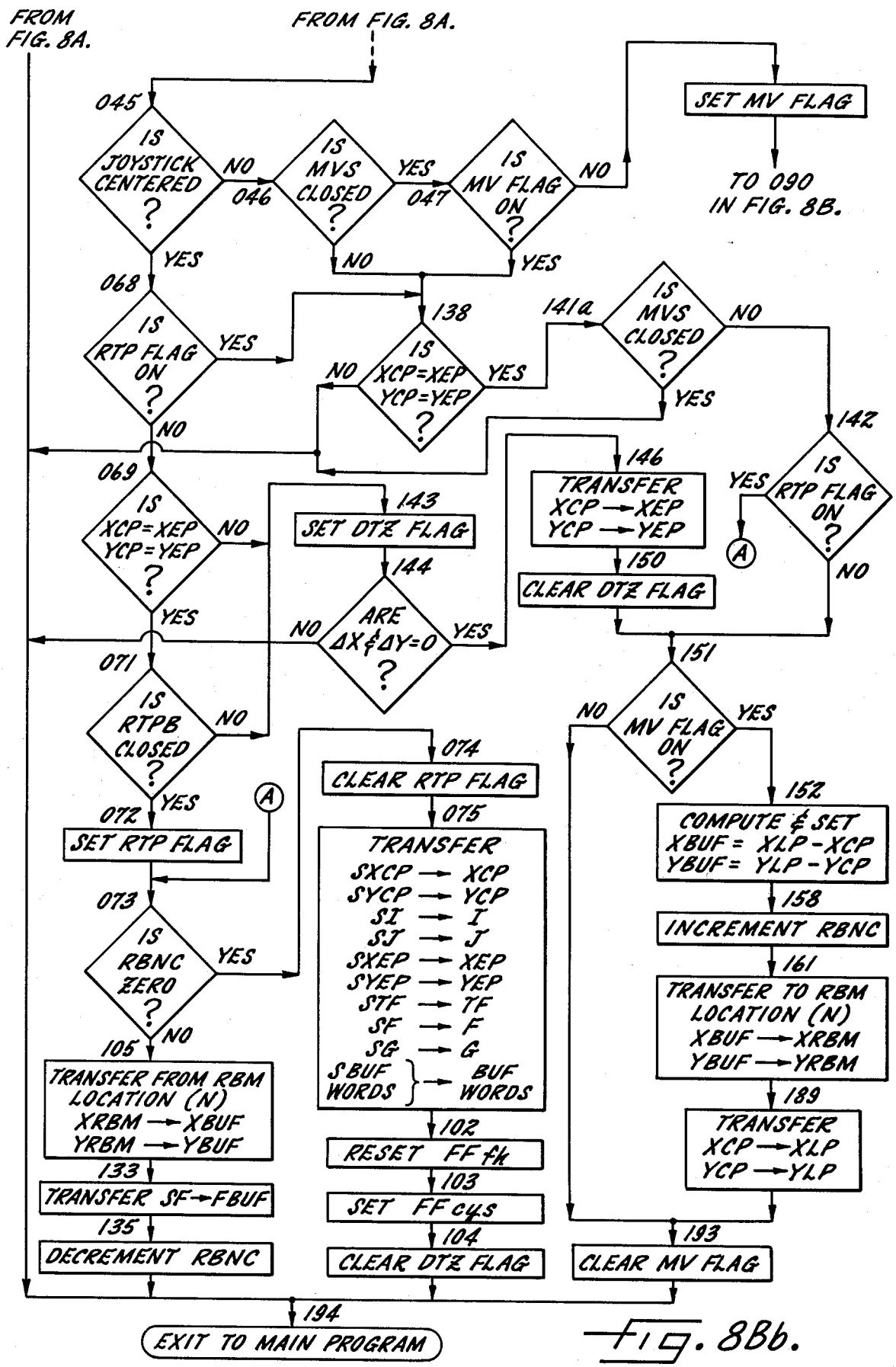

Referring to FIGS. 8A, 8B*b*, 8C and Table III, the subroutine steps 001 through 044 therein are identical to those set out and described earlier with reference to Table I. They are thus not redescribed here, and it will suffice to note that the program steps 035, 036, 037 and 043 shown in FIG. 8 and Table I for the first embodiment (but not significant therefor) are effectively utilized in the third embodiment. The program steps 045-051 listed in Table I and represented in the lower left of FIG. 8A are simply not used in the third embodiment. Thus, it is to be understood that the third embodiment involves a step 044 (represented at the bottom of FIG. 8A) followed by step 045 which appears at the top of FIG. 8B*b*.

Prior to the system startup (when $FF_{cys}$ is not set), or after normal system startup, or during normal running along the path, or during slowdown for stopping on the path in response to a feedhold signal, the subroutine cycles for the third embodiment are the same as those described above under the headings D(1), D(2), D(3) and D(4). Avoiding needless repetition, the third embodiment may be treated by considering that cycle descriptions under heading F(1), F(2), F(3), F(4) have here been described by incorporation by reference and reproduction of the text under previous headings D(1), D(2), D(3), D(4). A cycle in which the member is first found to have stopped on the path after decelerating to zero velocity in response to an earlier feedhold signal will thus next be treated.

F(5) A Cycle Immediately After Stopping on the Path

When a third embodiment subroutine is entered in response to an interrupt pulse immediately after the controlled member has reached zero velocity at a random stopping point on the path in response to a feedhold signal, the operations proceed from steps 001 through 005 (all as previously described with reference to FIG. 8A) to reach steps 006 and 007. Here the velocity of the controlled member is found for the first time to be zero because the ΔX and ΔY signals both have zero values. Thus, the system proceeds to step 008 where the flip-flop $FF_{cys}$ is reset, and then jumps to step 010 where the FH FLAG is found "off". Accordingly, the system proceeds to steps 011 through 038 and the "saving" transfer operations designated in FIG. 8A and Table I are performed. It is to be noted that for the third embodiment these transferring operations include sending the presently-existing values of XCP and YCP into the XLP and YLP memory registers. The signals of the latter designate the axis coordinates of the "last position" in which the member has been stopped, whether on the path or displaced therefrom, as will become apparent below.

Thereafter, the system proceeds to steps 039-043 where all of the buffer memory registers are cleared and the RBNC register is also set to zero. As will be noted hereinafter, the register RBNC is utilized as a "counter" to signal the number N of manually-initiated jogging moves which have been called for and carried out.

Next, the system performs step 044 to set the FH FLAG and then goes on to step 045 (FIG. 8B*b*). Here it will be found that the joystick is centered (because the member has just come to a halt on the path) and that the signal JC is 1. Thus, there is a jump to step 068 where the RTP FLAG is sensed and found to be 0 so the system proceeds to steps 069 through 070*a* where XCP and YCP will not be found respectively equal to XEP and YEP. Thereafter, the system jumps to step 143 at which the DTZ FLAG is set (without any effect, since it has already been set). Then the system executes steps 144, 145 to find ΔX and ΔY both zero and proceeds to steps 146-149 where the current values of XCP and YCP are respectively transferred to the end point registers XEP, YEP, for the purpose previously explained.

Thereafter, the system proceeds to step 150 to clear the DTZ FLAG and at step 151 senses the signal MV FLAG to find that it is not on. Thus, the system jumps from 151 to 193 where the MV FLAG is cleared (without effect since it was already 0) and exits from step 194 to the main program.

The member is now at rest at a random stopping point on the path, and all of the pertinent buffer and active data have been transferred to the "save" memory section, the stopping point coordinates are held at this time in both the XCP, YCP and XEP, YEP memory registers. The memory locations SXCP and SYCP similarly hold the coordinates of the member 14 as it resides at the stopping point on the path.

F(6) A Cycle With the Member Stopped on the Path

After a type F(5) cycle, the cycle start flip-flop $FF_{cys}$ is in a reset state and the FH FLAG is set. Therefore, with the member stopped on the path, the sequences of operations through a subroutine cycle are the same as for the type F(5) cycle described above, except that:

a. After entry into the subroutine at step 001, the system jumps to step 009, and proceeds to step 010 (see FIG. 8A);

b. From step 010 the system jumps to step 045 (the latter being illustrated at the top of FIG. 8B*b*); and c. At steps 069-070*a*, the compared coordinates will be found equal (having been set equal by the previous execution of steps 146-149) so that step 071 is performed to sense and find switch RTPB open—after which the system jumps to step 143.

Thereafter, the cycle continues in the manner described above for F(5) via steps 143, 144, 146, 150, 151, 193 and 194 to exit and return to the main program.

Thus, the control apparatus will leave the member stopped on the path for an indefinite period of time unless and until the operator selects and initiates a manual move.

F(7) A Cycle Initially Finding a Manual Move Requested

As explained above, the operator designates and initiates a manual jogging move by setting the selector switch 41, moving the direction selecting joystick 40a from center, and momentarily closing the move switch MVS. The first cycle which finds the latter switch closed will initiate the execution of the manual move.

Such a cycle precedes as a type F(6) cycle until step 045 is reached, and the signal JC is found to be zero (because the joystick is not centered). Therefore, the system proceeds to step 046 to find the signal MVS = 1, indicating that the operator has called for a manual move. The system then proceeds to step 047 and finds the MV FLAG to be 0, so it proceeds to step 048 where the MV FLAG is set to a "1" value.

Steps 048 through 067 for Table III are the same as steps 089 through 108 respectively in Table I. Thus, steps 048–067 for the third embodiment need not be redescribed here. As explained previously, the increment length and direction of a manual move selected by the operator are translated into an "artificial" block of command signals placed in XBUF, YBUF, FBUF, GBUF. The third embodiment system jumps from step 067 to the exit at step 194, and the cycle is complete.

Because a full block now resides in the buffer memory section, the main program will proceed (as noted above) to convert it into corresponding active signals stored in the active memory registers.

As the main program proceeds through its iterations, therefore, the member will begin moving along the selected "jog" segment.

F(8) A Cycle During Which a Manual Move is in Progress

After a type F(7) cycle, and while the manual move is in progress, each entry into the subroutine of FIGS. 8A, 8Bb and 8C (taken with Table III) will result in the same sequence of steps as in a type F(7) cycle—down to step 046 or 047. In the performance of these latter steps, either (a) the switch MVS will be found open, or (b) in any event, the MV FLAG will be found on. In either case, the system jumps to step 138 where the current position coordinate signals XCP and YCP are compared respectively with the end position coordinate signals XEP, YEP for the manual move in progress. Since it is assumed that the member 14 is still moving, the system will find at steps 138–141 inequality of the compared values so that it jumps to the exit at step 194 and returns to the main program. This will continue over and over until the member reaches the desired end point of the manual move.

F(9) A Cycle Which Ends a Manual Move

As the member is progressing along a manually initiated segment, the main program will set the DTZ FLAG and decelerate the member to a halt as it reaches the then-signaled end point location XEP, YEP. This is detected in a subroutine cycle which proceeds through the same sequential operations described for a type E(8) cycle down to step 138, and in which the performance of steps 138–141 results in a finding that the current position coordinates XCP and YCP are respectively equal to the end point coordinates XEP, YEP. Thereafter step 141a is executed to sense signal MVS from switch MVS. If that switch is closed, there is an immediate exit via step 194; but assuming that the operator has released switch MVS, the system proceeds to step 142 where the RTP FLAG is found to be 0, so the system jumps to step 151 where the MV FLAG is sensed and found now to be in a 1 state. Accordingly, the system proceeds to steps 152 through 157 where the computations and storages illustrated in FIG. 8Bb are performed.

Figure 11:
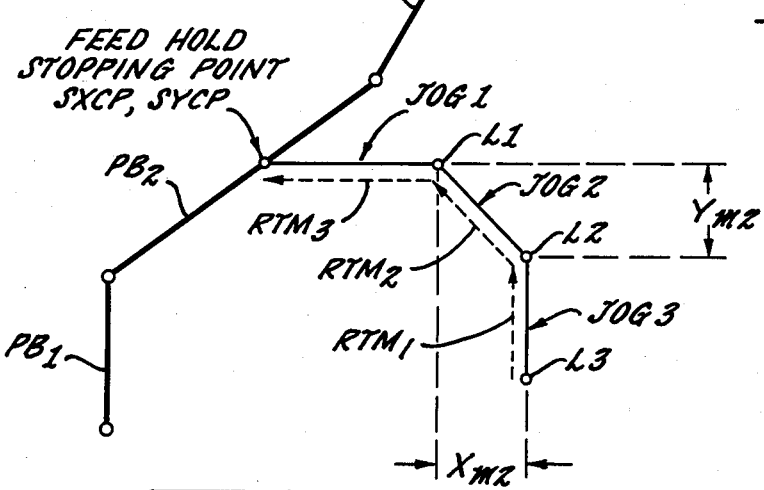

Since the controlled member 14 has just completed a manual move, the numerical lengths of that manual move are determined and stored in XBUF and YBUF, respectively. This is true because the signals XLP and YLP now represent the coordinate locations of the point from which the manual move began, while the signals XCP and YCP represent the coordinates of the location at which the member currently resides at the end of a manual move. Referring to FIG. 11, assume that the manual move just complete has translated the member from location L1 to location L2. The signals XLP, YLP represent the coordinates of location L1, and the signals XCP, YCP represent the coordinates of the location L2. By subtracting XCP from XLP, the result represents the X component distance $X_{m2}$; and by subtracting XCP from YLP, the result represents the Y component distance $Y_{m2}$. These two values (as indicated in FIG. 8Bb and Table III) are stored respectively as signals XBUF and YBUF in the performance of steps 152 through 157.

In effecting one feature of the third embodiment, provision is made to remember or store signals which directly or indirectly designate the axis component distances for each manual move after it has been completed. Moreover, as successive manual moves $N_1$, $N_2$ ... $N_n$ are called for and completed, the successive sets of such signals are stored in that order. This is done, as noted below, so that the manual moves may later be executed in a reverse order and direction. But, because a relatively large number of manual moves may be successively called for by the operator and executed, it is necessary to store each of the manual move distance components separately at a location where they can be retrieved. Indeed, they are stored in a fashion such that they are retrieved in the reverse sequence to which they have been executed.

For purposes of the third embodiment, therefore, the return buffer memory section 58e (FIG. 7) is formed with an arbitrarily selected number of pairs of memory registers. Each pair includes one register to hold an X axis component number XRBM and a second register to hold a Y axis component number YRBM. Each of these pairs of registers is designated or addressed by a prefix number so that they can be differentiated. As shown in FIG. 7, there are five pairs of such registers labeled with the prefix numbers 1 through 5. Merely for purposes of explanation here, it is assumed that the operator will not call for more than five manual moves, but of course, one skilled in the art will readily understand from the description which follows how a greater number of manual moves might be remembered and retrieved.

The register RBNC is employed as a counter to produce a signal N designating the memory register pair which is next to receive the storage of component numbers representing a manual move. This signal RBNC is set to zero at step 043 when a feedhold operation is initiated, as indicated in Table I. It thereafter "keeps track" of how many manual moves have been stored in (and how many have been retrieved from) the return memory buffer section.

With the foregoing in mind, at steps 158-160 (see FIG. 8Bb and Table III), the number held at RBNC is incremented or increased by 1. With the control member 14 initially stopped at SXCP, SYCP on the path (FIG. 11) the number RBNC will be zero, but after the first incrementing at steps 158-160, its signaled value will be 1.

The system then proceeds to step 161 where the axis components for the last-executed manual move are transferred for storage from their present location at XBUF and YBUF to an appropriate one of the return buffer register pairs. Phrased another way, if the memory buffer section pair is represented by the number N signaled by RBNC, then the signals currently in XBUF and YBUF will be transferred to the correspondingly numbered or addressed pair of return buffer registers.

Study of Table III at steps 161 through 189 will reveal the procedures by which this is accomplished. During steps 161 through 168 (Table III) the number RBNC is compared against the successive values of one, two, three, four. No comparison against the value five is required since it is known that RBNC at this time cannot be zero and if it does not have a value of one, two, three or four, it must have a value of five. When equality with one of the numbers one, two, three or four is found, then the subroutine program jumps to step 169, 173, 177 or 181. If none of these equalities is found, then the system jumps from step 168 to step 185. At each of those steps to which a jump is made, a sequence is performed to transfer the signals XBUF and YBUF to the correspondingly numbered pair of registers XRBM and YRBM; and once any such transfer has been performed, then the system jumps or proceeds to step 189. After the first manual move has been completed, the X and Y axis components thereof are stored at return buffer locations 1-XRBM and 1-YRBM; after the second manual move has been completed, the axis components therefor are stored at return buffer registers 2-XRBM and 2-YRBM, and so on. If five manual moves are executed, they will be stored respectively in the return buffer memory at those respective pairs of registers having the prefixes 1 through 5.

Since it is here assumed that the first manual move to take the member 14 away from the path has just been completed, the storage operations indicated for steps 161 through 188 will result in the axis components of the manual move being placed in 1-XRBM and 1-YRBM. The system performs steps 161, 162 of Table III, jumps to step 169-172, and then jumps to step 189.

At steps 189-192 the end point coordinates of the just-completed manual move are transferred to the XLP, YLP registers. This is done simply by transferring the values of XCP and YCP respectively into XLP and YLP. The latter signals therefore represent the "last position" at which the member has been brought to a stop after a manual move. When the member is first stopped on the path, these signals are set to represent the stopping point (see step 043).

From step 192, the system proceeds to step 193 at which the MV FLAG is cleared, and the system proceeds to step 194 where it exits for return to the main program.

Referring to FIG. 11, it may be assumed that the manual move from the stopping point SXCP, SYCP to location L1 has just been completed, and that the axis components for the move labled JOG1 are stored at the 1-XRBM, 1-YRBM pair of registers in the return buffer section.

If additional manual moves such as those labeled JOG2 and JOG3 are thereafter called for by the operator, the same subroutine sequences which have been described will be performed, and the axis components for the second and third manual moves will be stored in the register pairs of the return buffer section which have the numbers 2 and 3 as address prefixes. Also, each time a manual move is so stored, the counter signal RBNC will be increased by one. Thus, after the member has been moved to location L3 in FIG. 11 the value of the signal RBNC will be three.

Because the components of each successive manual move from the path are stored as just described, the system always creates and contains signals which represent the component displacements between the path stopping point and the location at which the member resides after any manually initiated move.

F(10) A Cycle Wherein a Manual Move is Terminated Prematurely by Centering the Joystick As stated earlier, any manual move which has been started and is in progress may be terminated simply by the operator shifting the joystick to its center position. When this occurs, the signal JC will switch from 0 to 1. Therefore, in one of the type E(8) cycles when a manual move is in progress, the subroutine will proceed as described under the heading E(8) down to step 045. At step 045, however, the joystick will be found centered, i.e., the signal JC equal to 1. Thus, the system will jump to step 068 where it will find the RTP FLAG off, proceeds to steps 069–070a and finds that XCP and YCP are not respectively equal to XEP and YEP (because the end point of the manual move has not been reached) and thus jumps to step 143, setting the DTZ FLAG. Again, at steps 144, 145 ΔX and ΔY will be found not both zero so the system will jump to the exit at 194 and return to the main program. Setting of the DTZ FLAG will cause subsequent iterations through the main program to reduce the member's velocity to zero, so that the member will halt before reaching the designated end point for the manual move which was in progress.

Subsequent cycles through the subroutine will proceed exactly as described immediately above until such time as the member comes to a stop with zero velocity. When this is first detected at steps 144, 145 (because ΔX and ΔY are both 0) the cycle proceeds to step 146 and performs the transfer operations designated for steps 146 through 149. Next, at step 150 the DTZ FLAG is cleared and the system proceeds to step 151. Here it will be sensed that the MV FLAG is on, so that the system will therefore proceed to step 152 and onward to perform steps 152 through 193 as hereinabove described.

Thus, the manual move which is prematurely terminated will nevertheless be treated as if it were fully consummated manual move. That is, the RBNC signal will be incremented and the axis components of the prematurely terminated manual move wll be stored at an appropriate pair of registers in the return buffer memory section. Thereafter at step 189 the coordinates of the end point of the just completed, and shortened, manual move will be transferred into the XLP, YLP registers; and the system will proceed to step 193 where the MV FLAG is cleared. The system exits and returns to the main program.

Up to five manual moves, whether they are fully completed or prematurely terminated, may be performed at the instigation and selection of the machine operator, and when the member is stopped at the end of any such manual move, the X axis component distances for all of the previous manual moves will be held in different pairs of the return buffer memory.

F(12) Assuring Return to the Path Stopping Point Before Restarting Normal Operations The apparatus of the third embodiment makes certain that the system cannot be restored to normal main program iterative operations to move the member toward the end point of the interrupted program path segment unless and until the member has been returned precisely to the path stopping point from which it has been displaced. In order to remove any reliance upon the operator's memory, a lapse of which might result in his pushing a cycle start button which would put the system back into its normal operating mode, the restart switch which is to be operated by the operator is responded to such that the member is returned automatically to the path stopping point by motions along all previously executed manual moves in reverse order and reverse directions.

Referring to FIG. 11 and assuming that the controlled member 14 has been manually jogged at location L3, the response to momentary closure of the "return to path" switch RTPB will be to cause the member to successively execute the return movements labeled $RTM_1$, $RTM_2$ and $RTM_3$.

This may be understood by considering a sequence through the third embodiment subroutine which finds the "return to path" switch closed at a time when the controlled member is at location L3 shown in FIG. 11.

With the member 14 stationary at location L3, an interrupt pulse causing entry into the subroutine at step 001 will result in sequences which are the same as those described above at F(6) until step 071 is reached. At step 071, however, it will be found that the switch RTPB is closed because the operator has momemtarily depressed it in order to initiate a "return to path" operation. This switch may thus be viewed as a restart switch which creates a restart signal RTPB (FIG. 7).

Under these assumed conditions, the system will proceed from step 071 to step 072 where the RTP FLAG will be set. Then, at step 073 the return block number counter signals RBNC will be compared against zero. Since it is assumed that the member has been jogged away from the path stopping point by three manually-initiated moves (FIG. 11), the value of RBNC at this time will be three so that after step 073 the system will jump to step 105.

In the performance of steps 105 through 112 as detailed in Table III, the currently existing value of RBNC is compared against the possible values of one, two, three, four. If none of these comparisons shows equality, then it is known that the value of RBNC is five. If it is found that the value of RBNC is one, two, three, four or five then the subroutine program jumps to steps 113, 117, 121, 125 or 129, respectively. Under the conditions here assumed, it will be found that RBNC has a value of three, so that the program will jump to step 121.

At steps 121 through 124 the signals then held in return memory buffer locations 3-XRBM and 3-YRBM will be transferred respectively to XBUF and YBUF; and at step 124 there will be a jump to step 133. At step 133, the feed rate number from SF is read and then transferred on step 134 to FBUF. It will be recalled that GBUF has been set to hold the 01 number so that the buffer memory section now contains a full "articical" block of command signals. With reference to FIG. 11, these are command signals which define the return move $RTM_1$.

The system then proceeds to step 135. In performing steps 135 through 137 the value of the number RBNC is decremented. From step 137 the system jumps to the exist at 194 and returns to the main program.

When the main program is entered and as it goes through successive iterations, it will process the artificial block of data just transferred to the buffer memory section in order to create an active block of command signals. Appropriate values of $\Delta X$ and $\Delta Y$ will be determined and the advancing target point coordinate signals XCP and YCP will be iteratively changed. Thus, the controlled member will move progressively from location L3 (FIG. 11) toward location L2.

While such movement is progressing along the return segment $RTM_1$, the subroutine will be entered many times due to interrupt pulses. The sequence through the subroutine under these conditions may be briefly noted, as follows, remembering that the RTP FLAG has now been set and that the joystick is centered.

When the subroutine is entered at step 001, the sequence of operations follows that hereinabove described for a type F(8) cycle down to step 068. Here the RTP FLAG is found on, so the system jumps to step 138. At steps 138–141, the values of XCP and YCP are compared with XEP and YEP to determine whether or not the member has reached the end point coordinates XEP, YEP. It is to be recalled that when the artificial block of command signals was previously placed in the buffer memory section, the end point coordinates corresponding to the location L2 (FIG. 11) were derived and stored in XEP, YEP. Thus, the previously-initiated return move will proceed under the main program until the main program decelerates the member to a stop at location L2. Therefore, when the return move $RTM_1$ has been completed XCP will become equal to XEP and YCP will become equal to YEP.

Under the assumption that the return move $RTM_1$ is still in progress, the subroutine program will jump from step 139 or 141 to step 194, thereby returning the system to the main program.

When, however, the comparison made at steps 138–141 indicates that the member has stopped at the end of the return move (i.e., location L2 in FIG. 11) then the system will proceed from step 141 to 141a, find the move switch MVS open, and go to step 142. At the latter step it will be found that the RTP FLAG is on, so the system will return to step 073. Next, in the performance of step 073 the RBNC number will be compared against zero and found to have a value of two (having previously been decremented from three to two).

Thus the system will jump to step 105 and proceed again through all of those steps 105 through 137 above, then exiting for return to the main program. When this occurs, the axis displacement numbers stored at the time of the JOG2 move will be pulled from return buffer memory locations 2-XRBM and 2-YRBM for transfer to XBUF and YBUF, and RBNC will be decremented. Therefore, after the exit following step 137 the system will be conditioned to execute the return path move RTM$_2$. When the system stops at location L1 another return move RTM$_3$ will be initiated to return the member precisely to the original path stopping point labeled SXCP, SYCP in FIG. 11.

F(13) A Cycle Finding That the Member Has Returned to the Path Stopping Point When the artificial block of command signals for the return path movement RTM$_3$ is transferred to the buffer memory section, the decrementing of the RBNC signals returns the latter to zero. Therefore, after the return move RTM$_3$ is completed and step 142 is performed to sense the RTP FLAG, it will be found that the RTP FLAG is on, so the system will return to step 073 to find that the number RBNC is now zero. Thus, instead of jumping from step 073 to step 105, the system will proceed to step 074.

At step 074, the RTP FLAG is cleared (the total return motion having been now completed), and the system now progresses to step 075. In proceeding through steps 075-101, all of the "saved" data are transferred from the save memory section to the buffer and active memory sections as previously described with reference to the first embodiment and steps 056 to 082 in Table I. Thus, this return of saved data need not be described again.

After such return to save data, the system proceeds to step 102 and resets the feedhold flip-flop FF$_{fh}$. Thereafter, at step 103 the cycle start flip-flop FF$_{cys}$ is set, placing the system in its normal running mode for movement of the member along the programmed path. Next, at step 104, the DTZ FLAG is cleared so that the member will begin movement from its previous path stopping point onwardly along the programmed path segment PB$_2$ (FIG. 11). From step 104 the system jumps to step 194 and exits to the main program.

In this fashion, and in response to momentary closure of the "return switch" RTPB, the movable member is caused to return from any location displaced from a stopping point on the path via a route identical to that determined in the first instance by one or more operator-selected jogging moves. The previous jogging moves are executed in reverse order and in reverse directions so that the controlled member ends up at the original path stopping point. When it arrives there, the system automatically is placed back into normal operation and the member resumes its travel along the interrupted programmed path segment. Because of the return route which the controlled member takes, it cannot inadvertently collide with some fixture or machine component, since undoubtedly the operator in selecting his moves to jog the member away from the path will have avoided all obstacles.

RESUME'

The present invention brings to the art of numerical controls the improvement by which the system is safely and conveniently restarted into normal path operation after the movement along a programmed path has been interrupted at any time by a feedhold signal and the controlled member has been shifted away (by one or more manually selected moves) from the path stopping point. A forgetful actuation of a restart switch when the member is displaced from the stopping point, or more accurately the damage which it may cause, is eliminated.

The invention may be practiced in any number of specific embodiments, three of which have here been described. In each, a restart signal is ineffective to restore the system to normal path control sequences until the controlled member is first restored to the path stopping point. In the first embodiment, the restart switch (CYSB) is, in effect, disabled or locked out until the operator, by observing a visual display of departures from the path, has manually jogged the member back to the stopping point. In the second embodiment, a restart switch (RTPB), when actuated to produce a restart signal, first causes the member to move from its displaced position automatically to the path stopping point, and only thereafter the system is automatically restored to normal path control sequences. In the third embodiment, a restart switch (RTPB), when actuated to produce a restart signal, first causes the member to move automatically from its displaced position to the path stopping point via a series of moves which follow the reverse order and opposite directions of the one or more manually initiated moves previously selected by the operator; and only thereafter the system is automatically restored to normal path control sequences.

The three embodiments here described as examples are physically constructed by conditioning a digital computer with a software subroutine program of instructions, as fully described above. It is not essential in the practice of the invention, however, that a digital computer be employed, or indeed that a software program of instructions be utilized—although that is perhaps the most economical approach chosen in reducing the invention to practice in its preferred form. On the contrary, it will be readily apparent to those skilled in the art from the teachings herein contained, that equivalent embodiments of the invention may be constructed (i) by hardwiring a digital computer to carry out the sequences; or alternatively (ii) by routinely organizing counterpart analog control apparatus from the present teachings in a well known fashion. In either case, the resulting apparatus will perform substantially the same functions in what are known in the art to be substantially the same and interchangeable manners.

TABLE I

SUBROUTINE PROGRAM LISTING FOR CONTROL ACCORDING TO FIGS. 8A, 8B and 8C

| | |
|---|---|
| (a) | Enter in response to timed interrupt signal derived from clock every 32 milliseconds |
| 001 | CACC*; Read* CYS<br>If ANS* = 1, proceed to 002<br>If ANS = 0, jump to 009 |
| 002 | CACC; Read FHPS<br>If ANS = 1, proceed to 003<br>If ANS = 0, jump to 004 |
| 003 | Set FF$_{fh}$ (i.e., write "1" to set input of FF$_{fh}$) |
| 004 | CACC; Read FH from FF$_{fh}$<br>If ANS = 1, proceed to 005<br>If ANS = 0, jump to 122 (exit) |
| 005 | Set DTZ Flag Bit (Write 1 to DTZ) |
| 006 | CACC; Read ΔX<br>If ANS = 0, proceed to 007<br>If Ans ≠ 0, jump to 122 (exit) |
| 007 | CACC; Read ΔY<br>If ANS = 0, proceed to 008<br>If ANS ≠ 0, jump to 122 (exit) |
| 008 | Reset FF$_{cys}$ (i.e., write "1" to reset input of FF$_{cys}$); and jump to 010 |
| 009 | CACC; Read FH<br>If ANS = 1, proceed to 010<br>If ANS = 0, jump to 122 (exit) |

*Note:
Symbol CACC designates "clear accumulator".
Symbol ANS refers to the output signaled by accumulator.
"Read" means bring in a signaled word from memory to ALU input.
"Write" means transfer the accumulator output signal to designated memory location.

| | |
|---|---|
| 010 | CACC; Read FH FLAG<br>If ANS = 0, proceed to 011<br>If ANS = 1, jump to 045 |

TABLE I-continued
SUBROUTINE PROGRAM LISTING FOR CONTROL ACCORDING TO FIGS. 8A, 8B and 8C

| | |
|---|---|
| 011 | CACC; Read XCP |
| 012 | Write to SXCP |
| 013 | CACC; Read YCP |
| 014 | Write to SYCP |
| 015 | CACC; Read I |
| 016 | Write to SI |
| 16a | CACC; Read J |
| 016b | Write to SJ |
| 017 | CACC; Read XEP |
| 018 | Write to SXEP |
| 019 | CACC; Read YEP |
| 020 | Write to SYEP |
| 021 | CACC; Read TF |
| 022 | Write to STF |
| 023 | CACC; Read F |
| 024 | Write to SF |
| 025 | CACC; Read G |
| 026 | Write SG |
| 027 | CACC; Read XBUF |
| 028 | Write SXBUF |
| 029 | CACC; Read YBUF |
| 030 | Write to SYBUF |
| 031 | CACC, Read FBUF |
| 032 | Write to SFBUF |
| 033 | CACC; Read GBUF |
| 034 | Write to SGBUF |
| *035 | CACC; Read XCP |
| *036 | Write to XLP |
| *037 | CACC; Read YCP |
| *038 | Write to YLP |
| 039 | CACC; Write (zero) to XBUF |
| 040 | Write (zero) to YBUF |
| 041 | Write (zero) to FBUF |
| 042 | Write (zero) to GBUF |
| *043 | Write (zero) to RBNC |
| 044 | Write "1" to FH FLAG |
| 045 | CACC; Read SXCP |
| 046 | Read XCP subtractively (with - sign) |
| 047 | Write to XFH |
| 048 | CACC; Read SYCP |
| 049 | Read YCP subtractively |
| 050 | Write to YFH |
| 051 | CACC; Read XFH |
| | If ANS = 0, proceed to 052 |
| | If ANS ≠ 0, jump to 086 |
| 052 | CACC; Read YFH |
| | If ANS = 0, proceed to 053 |
| | If ANS ≠ 0, jump to 086 |
| 053 | CACC; Read CYSB |
| | If ANS = 1, proceed to 054 |
| | If ANS = 0, jump to 086 |
| 054 | CACC; Read ΔX |
| | If ANS =0, proceed to 055 |
| | If ANS ≠ 0, jump to 086 |

*Note:
Omit these operations except for third embodiment.

| | |
|---|---|
| 055 | CACC; Read ΔY |
| | If ANS = 0, proceed to 056 |
| | If ANS ≠ 0, jump to 086 |
| 056 | CACC; Read SXCP |
| 057 | Write to XCP |
| 058 | CACC; Read SYCP |
| 059 | Write to YCP |
| 060 | CACC; Read SI |
| 061 | Write to I |
| 062 | CACC; Read SJ |
| 063 | Write to J |
| 064 | CACC; Read SXEP |
| 065 | Write to XEP |
| 066 | CACC; Read SYEP |
| 067 | Write to YEP |
| 068 | CACC; Read STF |
| 069 | Write to TF |
| 070 | CACC; Read SF |
| 071 | Write to F |
| 072 | (No instruction) |
| 073 | CACC; Read SG |
| 074 | Write to G |
| 075 | CACC; Read SXBUF |
| 076 | Write to XBUF |
| 077 | CACC; Read SYBUF |
| 078 | Write to YBUF |
| 079 | CACC; Read SFBUF |
| 080 | Write to FBUF |
| 081 | CACC; Read SGBUF |
| 082 | Write to GBUF |
| 083 | Reset FF$_{fh}$ |
| 084 | Set FF$_{cys}$ |
| 085 | Clear DTZ FLAG (set to 0) |
| | Jump to 122 (exit) |

TABLE I-continued
SUBROUTINE PROGRAM LISTING FOR CONTROL ACCORDING TO FIGS. 8A, 8B and 8C

| | |
|---|---|
| 086 | CACC; Read JC |
| | If ANS = 0, Proceed to 087 |
| | If ANS = 1, jump to 109 |
| 087 | CACC; Read MVS |
| | If ANS = 1, proceed to 088 |
| | If ANS = 0, jump to 117 |
| 088 | CACC; Read MV FLAG |
| | If ANS = 0, proceed to 089 |
| | If ANS = 1, jump to 117 |
| 089 | Write "1" to MV FLAG |
| 090 | CACC; Read S. 001 |
| | If ANS = 1, proceed to 091 |
| | If ANS = 0, jump to 092 |
| 091 | CACC; Write .001 to SP1; jump to 095 |
| 092 | CACC; Read S1.0 |
| | If ANS = 1, proceed to 093 |
| | If ANS = 0, jump to 094 |
| 093 | CACC; Write 1.0 to SP1; jump to 095 |
| 094 | CACC; Write 100 to SP1 |
| 095 | CACC; Read SSXP |
| | If ANS = 1, proceed to 096 |
| | If ANS = 0, jump to 098 |
| 096 | CACC; Read SP1 |
| 097 | Write to XBUF; and jump to 101 |
| 098 | CACC; Read SSXM |
| | If ANS = 1, proceed to 099 |
| | If ANS = 0, jump to 101 |
| 099 | CACC; Read SP1 subtractively (with - sign) |
| 100 | Write to XBUF |
| 101 | CACC; Read SSYP |
| | If ANS = 1, proceed to 102 |
| | If ANS = 0, jump to 104 |
| 102 | CACC; Read to SP1 |
| 103 | Write to YBUF; jump to 107 |
| 104 | CACC; Read SSYM |
| | If ANS = 1, proceed to 105 |
| | If ANS = 0, jump to 107 |
| 105 | CACC; Read SP1 subtractively |
| 106 | Write to YBUF |
| 107 | Write 01 to GBUF |
| 108 | Write 100 to FBUF; jump to 122 (exit) |
| 109 | Set DTZ FLAG (write 1 to DTZ) |
| 110 | CACC; Read ΔX |
| | If ANS = 0, proceed to 111 |
| | If ANS ≠ 0, jump to 122 (exit) |
| 111 | CACC; Read ΔY |
| | If ANS = 0, proceed to 112 |
| | If ANS ≠ 0, jump to 122 (exit) |
| 112 | CACC; Read XCP |
| 113 | Write to XEP |
| 114 | CACC, Read YCP |
| 115 | Write to YEP |
| 116 | Clear DTZ FLAG (write 0 to DTZ); jump to 121 |
| 117 | CACC; Read XCP |
| 118 | Read XEP subtractively |
| | If ANS = 0, proceed to 119 |
| | If ANS ≠ 0, jump to 122 (exit) |
| 119 | CACC; Read YCP |
| 120 | Read YEP subtractively |
| | If ANS = 0, proceed to 120a |
| | If ANS ≠ 0, jump to 122 (exit) |
| 120a | CACC; Read MVS |
| | If ANS = 0, proceed to 121 |
| | If ANS = 1, jump to 122 |
| 121 | Clear (set 0) MV FLAG |
| 122 | Exit and return to MAIN program |

TABLE II
SUBROUTINE PROGRAM LISTING FOR CONTROL ACCORDING TO FIGS. 8A, 8Ba, AND 8C

SAME INSTRUCTION STEPS 001
THROUGH 050 AS IN TABLE I LISTING,
Except jumps to EXIT herein are to step 131.

| | |
|---|---|
| 051 | CACC; Read JC |
| | If ANS=1, proceed to 052 |
| | If ANS=0, jump to 064 |
| 052 | CACC; Read RTP FLAG |
| | If ANS=0, proceed to 053 |
| | If ANS=1, jump to 086 |
| 053 | CACC; Read XCP |
| 053a | Read XEP subtractively |
| | If ANS=0, proceed to 054 |
| | If ANS≠0, jump to 121 |
| 054 | CACC; Read YCP |
| 054a | Read YEP subtractively |

TABLE II-continued
SUBROUTINE PROGRAM LISTING FOR CONTROL ACCORDING TO FIGS. 8A, 8Ba, AND 8C SAME INSTRUCTION STEPS 001 THROUGH 050 AS IN TABLE I LISTING, Except jumps to EXIT herein are to step 131.

|     |     |
| --- | --- |
|     | If ANS=0, proceed to 055 |
|     | If ANS≠0, jump to 121 |
| 055 | CACC; Read RTPB |
|     | If ANS=1, proceed to 056 |
|     | If ANS=0, jump to 121 |
| 056 | CACC; Read XFH |
| 057 | Write to XBUF |
| 058 | CACC; Read YFH |
| 059 | Write YBUF |
| 060 | CACC; Read SF |
| 061 | Write to FBUF |
| 062 | Write 01 to GBUF |
| 063 | Set RTP FLAG; jump to 131 (exit) |
| 064 | CACC; Read MVS |
|     | If ANS=1, proceed to 065 |
|     | If ANS=0, jump to 086 |
| 065 | CACC; Read MV FLAG |
|     | If ANS=0, proceed to 066 |
|     | If ANS=1, jump to 086 |
| 066 ⎫ | STEPS 066 THROUGH 085 HEREIN CORRESPOND TO |
| ⎬ | STEPS 089 THROUGH 108, AS LISTED IN TABLE I, |
| 085 ⎭ | except jump from step 085 herein is to EXIT 131, |
| 086 | CACC; Read XCP |
| 087 | Read XEP subtractively |
|     | If ANS=0, proceed to 088 |
|     | If ANS≠0, jump to 131 (exit) |
| 088 | CACC; Read YCP |
| 089 | Read YEP subtractively |
|     | If ANS=0, proceed to 090 |
|     | If ANS≠0, jump to 131 (exit) |
| 090 | CACC; Read RTP FLAG |
|     | If ANS=0, proceed to 090a |
|     | If ANS=1, jump to 191 |
| 0a0a | CACC; Read MVS |
|     | If ANS=0, jump to 129 |
|     | If ANS=1, jump to 131 (exit) |
| 091 ⎫ | STEPS 091 THROUGH 120 HEREIN CORRESPOND TO |
| ⎬ | STEPS 056 THROUGH 085, RESPECTIVELY, As LISTED IN TABLE I, |
| 120 ⎭ | except jump from step 120 herein is to EXIT 131, |
| 121 | Write "1" to DTZ FLAG |
| 122 | CACC, Read ΔX |
|     | If ANS=0, proceed to 123 |
|     | If ANS≠0, jump to 131 (exit) |
| 123 | CACC; Read ΔY |
|     | If ANS=0, proceed to 124 |
|     | If ANS≠0, jump to 131 (exit) |
| 124 | CACC; Read XCP |
| 125 | Write to XEP |
| 126 | CACC; Read YCP |
| 127 | Write to YEP |
| 128 | Clear (set zero) DTZ FLAG |
| 129 | Clear (set zero) MV FLAG |
| 130 | Clear (set zero) RTP FLAG |
| 131 | Exit and Return to MAIN Program |

TABLE III
SUBROUTINE PROGRAM LISTING FOR CONTROL ACCORDING TO FIGS. 8A, 8Bb, and 8C SAME INSTRUCTION STEPS 001 THROUGH 044 AS IN LISTING, INCLUDING TABLE I STEPS 035, 036,3 037,038 and 043. TABLE I STEPS, 045 – 051 ARE NOT PERFORMED FOR THIS TABLE III ROUTINE.

|     |     |
| --- | --- |
| 045 | CACC; Read JC |
|     | If ANS = 0, proceed to 046 |
|     | If ANS = 1, jump to 068 |
| 046 | CACC; Read MVS |
|     | If ANS = 1, proceed to 047 |
|     | If ANS = 0, jump to 138 |
| 047 | CACC; Read MV FLAG |
|     | If ANS = 0, proceed to 048 |
|     | If ANS = 1, jump to 138 |

TABLE III-continued
SUBROUTINE PROGRAM LISTING FOR CONTROL ACCORDING TO FIGS. 8A, 8Bb, and 8C SAME INSTRUCTION STEPS 001 THROUGH 044 AS IN LISTING, INCLUDING TABLE I STEPS 035, 036,3 037,038 and 043. TABLE I STEPS, 045 – 051 ARE NOT PERFORMED FOR THIS TABLE III ROUTINE.

|     |     |
| --- | --- |
| 048 ⎫ | STEPS 048 through 067 HEREIN CORRESPOND |
| ⎬ | TO STEPS 089 THROUGH 108 IN TABLE I. |
| 067 ⎭ | |
| 068 | CACC; Read RTP FLAG |
|     | If ANS = 0, proceed to 069 |
|     | If ANS = 1, jump to 138 |
| 069 | CACC; Read XCP |
| 069a | Read XEP Subtractively |
|     | If ANS = 0, proceed to 070 |
|     | If ANS ≠ 0, jump to 143 |
| 070 | CACC; Read YCP |
| 070a | Read YEP subtractively |
|     | If ANS = 0, proceed to 071 |
|     | If ANS ≠ 0, jump to 143 |
| 071 | CACC; Read RTPB |
|     | If ANS = 1, proceed to 072 |
|     | If ANS = 0, jump to 143 |
| 072 | Write "1" into RTP FLAG |
| 073 | CACC; Read RBNC |
|     | If ANS = 0, proceed to 074 |
|     | If ANS ≠ 0, jump to 105 |
| 074 | Clear (write 0) RTP FLAG |
| 075 ⎫ | STEPS 075 THROUGH 102 HEREIN CORRESPOND |
| ⎬ | TO STEPS 056 THROUGH 083, RESPECTIVELY IN |
| 102 ⎭ | TABLE I |
| 103 | Set FF$_{cr}$ |
| 104 | Clear DTZ FLAG; jump to exit 194 |
| 105 | CACC; Read RBNC |
| 106 | Read 1 subtractively |
|     | If ANS ≠ 0, proceed to 107 |
|     | If ANS = 0, jump to 113 |
| 107 | CACC; Read RBNC |
| 108 | Read 2 subtractively |
|     | If ANS ≠ 0, proceed to 109 |
|     | If ANS = 0, jump to 117 |
| 109 | CACC; Read RBNC |
| 110 | Read 3 subtractively |
|     | If ANS ≠ 0, proceed to 111 |
|     | If ANS = 0, jump to 121 |
| 111 | CACC; Read RBNC |
| 112 | Read 4 subtractively |
|     | If ANS ≠ 0, jump to 129 |
|     | If ANS = 0, jump to 125 |
| 113 | CACC; Read 1-XRBM |
| 114 | Write to XBUF |
| 115 | CACC; Read 1-YRBM |
| 116 | Write to YBUF; jump to 133 |
| 117 | CACC; Read 2-XRBM |
| 118 | Write to XBUF |
| 119 | CACC; Read 2-YRBM |
| 120 | Write to YBUF; jump to 133 |
| 121 | CACC; Read 3-XRBM |
| 122 | Write to XBUF |
| 123 | CACC; Read 3-YRBM |
| 124 | Write to YBUF; jump to 133 |
| 125 | CACC; Read 4-XRBM |
| 126 | Write to XBUF |
| 127 | CACC; Read 4-YRBM |
| 128 | Write to YBUF; jump to 133 |
| 129 | CACC; Read 5-XRBM |
| 130 | Write to XBUF |
| 131 | CACC; Read 5-YRBM |
| 132 | Write to YBUF |
| 133 | CACC; Read SF |
| 134 | Write to FBUF |
| 135 | CACC; Read RBNC |
| 136 | Read 1.0 subtractively ⎫ Decrement |
| 137 | Write to RBNC; jump to EXIT ⎭ RBNC |
| 138 | CACC; Read XCP |
| 139 | Read XEP subtractively |
|     | If ANS = 0, proceed to 140 |
|     | If ANS ≠ 0, jump to EXIT 194 |
| 140 | CACC; Read YCP |
| 141 | Read YEP subtractively |
|     | If ANS = 0, proceed to 141a |
|     | If ANS ≠ 0, jump to EXIT 194 |
| 141a | CACC; Read MVS |
|     | If ANS = 0, proceed to 142 |

TABLE III-continued
SUBROUTINE PROGRAM LISTING FOR CONTROL ACCORDING TO FIGS. 8A, 8Bb, and 8C SAME INSTRUCTION STEPS 001 THROUGH 044 AS IN LISTING, INCLUDING TABLE I STEPS 035, 036,3 037,038 and 043. TABLE I STEPS, 045 – 051 ARE NOT PERFORMED FOR THIS TABLE III ROUTINE.

```
        If ANS = 1, jump to EXIT 194
142     Read RTP FLAG
        If ANS = 1, RETURN to 073
        If ANS = 0, jump to 151
143     Write 1 to DTZ FLAG
144     CACC; Read ΔX
        If ANS = 0, proceed to 145
        If ANS ≠ 0, jump to EXIT 194
145     CACC; Read ΔY
        If ANS = 0, proceed to 146
        If ANS ≠ 0, jump to EXIT 194
146     CACC; Read XCP
147     Write to XEP
148     CACC; Read YCP
149     Write to YEP
150     Write zero to DTZ FLAG
151     CACC; Read MV FLAG
        If ANS = 1, proceed to 152
        If ANS = 0, jump to 193

152     CACC; Read XLP       ⎫
153     Read XCP subtractively |    Set
154     Write XBUF           ⎬    XBUF = XLP - XCP
155     CACC; Read YCP       |    YBUF = YLP - YCP
156     Read YCP subtractively|
157     Write to YBUF        ⎭

158     CACC; Read RBNC  ⎫   INCREMENT
159     Read 1.0         ⎬   RBNC
160     Write to RBNC    ⎭       RBNC becomes >0

161     CACC; Read RBNC
162     Read 1 subtractively
        If ANS ≠ 0, proceed to 163
        If ANS = 0, jump to 169
163     CACC; Read RBNC
164     Read 2 subtractively
        If ANS ≠ 0, proceed to 165
        If ANS = 0, jump to 173
165     CACC; Read RBNC
166     Read 3 subtractively
        If ANS ≠ 0, proceed to 167
        If ANS = 0, jump to 177
167     CACC; Read RBNC
168     Read 4 subtractively
        If ANS ≠ 0, jump to 185
        If ANS = 0, jump to 181
169     CACC; Read XBUF
170     Write to 1-XRBM
171     CACC; Read YBUF
172     Write to 1-YRBM; jump to 189
173     CACC; Read XBUF
174     Write to 2-XRBM
175     CACC; Read YBUF
176     Write to 2-YRBM; jump to 189
177     CACC; Read XBUF
178     Write to 3-XRBM
179     CACC; Read YBUF
180     Write to 3-YRBM; jump to 189
181     CACC; XBUF
182     Write to 4-XRBM
183     CACC; YBUF
184     Write to 4-YRBM; jump to 189
185     CACC; XBUF
186     Write to 5-XRBM
187     CACC; YBUF
188     Write to 5-YRBM
189     CACC; Read XCP
190     Write to XLP
191     CACC; Read YCP
192     Write to YLP
193     Write 0 to MV FLAG; jump to EXIT 194
194     EXIT to MAIN Program
```

We claim:

1. In a numerical contouring control system for moving a member simultaneously along plural axes to execute a programmed path, said system including
   a. control means responsive to a block of command signals for moving the member along a corresponding path segment defined by such signals, and
   b. means for supplying successive ones of a program of blocks of command signals to said control means (a) to cause said member to be moved seriatim through the segments of a programmed path, the improvement comprising
      1. means for interrupting the sequential operation of said means (a) and (b) and stopping the member at a random point on the path,
      2. means effective after the member has been so stopped for moving the member to various desired successive locations displaced from the stopping point,
      3. means for creating signals which directly or indirectly represent the axis component displacements between (i) said stopping point and (ii) the actual location of said member after each movement created by said means (2),
      4. means for producing a restart signal,
      5. means responsive to said restart signal for restoring said means (a) and (b) to normal sequential operation, and
      6. means controlled by said means (3) for disabling said means (5) unless and until said member is positioned at said path stopping point.

2. The improvement defined by claim 1 further charactertized in that said control means (a) includes
   c. means for storing a block of command signals received from said means (b) and for representing thereto to move the member, and further including
      7. saving storage means,
      8. means responsive to stopping of the member by operation of said means (a) for transferring the command signals stored in said means (c) to said means (7), and
      9. means forming a part of said means (5) and responsive to said restart signal for transferring the command signals stored in said means (7) to said means (c).

3. The improvement defined by claim 2 further characterized in that said means (2) includes
      2a. manually adjusted selector means for producing one or more successive sets of signals constituting artificial blocks of command signals, and
      2b. means for supplying each said set of command signals to said means (c) to cause the member to be moved the distance and the direction represented by such set.

4. The improvement defined by claim 1 further characterized in that said means (a) includes
   c. means for producing signals effectively repesenting the actual position axis coordinates of the member as it progresses along a segment, and further including
      7. means for storing said actual position coordinate signals in response to stopping of the member by operation of said means (1), and wherein said means (3) includes
      3a. means responsive to the signals stored in said means (7) for producing said signals which represent axis component displacements.

5. The improvement defined by claim 2 further chracterized in that said means (4) for producing a restart signal is a restart switch, and said means (5) and (6) include
      i. means responsive to momentary actuation of said switch for initiating operation of said means (9), and ii. means for rendering said switch ineffective so long as said component displacement signals from said means (3) are not substantially zero.

6. The improvement defined by claim 1 further characterized in that said means (5) and (6) together comprise
  i. means responsive to said displacement signals from said means (3), and initiated into operation by said restart signal, for moving the member simultaneously along the axes through distances corresponding to the respective axis displacement signals, thereby to return the member to said path stopping point, and
  ii. means responsive to completion of operation by said means (i) for restoring said means (a) and (b) to normal sequential operations.

7. The improvement defined by claim 1 further characterized in that said means (3) includes
  3a. means responsive to completion of each operation by said means (2) for creating and storing a set of signals representing axis component displacements between the previous and the present location of the member, one such signal set being stored for each move of the member as it travels away from said stopping point,
  and wherein said means (5) and (6) together comprise
    i. means responsive to any of said signal sets for moving the member simultaneously along the axes through distances corresponding to the respective axis component signals of that set,
    ii. means, initiated into operation by said restart signal, for supplying said signal sets sequentially from said means (3a) to said means (i) in the reverse of the order in which they have been stored, and
    iii. means responsive to completion of operation of said means (i) in response to the first-stored signal set for restoring said means (a) and (b) to normal sequential operations.

8. In a numerical path control system for controlling the movements of a member along plural axes, and including control means responsive to a program of successive blocks of command signals for automatically moving the member seriatim along respective corresponding path segments, the improvement comprising
  a. means responsive to a feedhold signal for stopping the member at a random point along the path, and for interrupting operation of said control means,
  b. means for storing signals representing the axis coordinates of the stopping point of the member each time it halts in response to a feedhold signal,
  c. means effective after the member has so stopped for moving the member under manual control and independently of said program command signals to various desired locations displaced from said stopping point,
  d. means for producing displacement signals which represent the axis component displacements between said stopping point and any location in which the member resides after movement thereof by said means (c), and
  e. means operative only after said axis displacement signals have been reduced substantially to zero for causing said control means to resume operation.

9. In a numerical path control system for controlling the movements of a member along plural axes, said system including a. a source of block command signals controllable upon demand to deliver successive blocks of signals defining successive corresponding path segments,
b. control means responsive to each block of command signals for moving said member along the corresponding defined path segment, and
c. means responsive to completion of one segment of movement for transferring from said source (a) to said control means (b) the next successive block of command signals, so that said member is moved seriatim through a program of successive path segments, the improvement comprising
  1. means for producing a feedhold signal at random instants while said member is being moved by said control means (b),
  2. means responsive to a feedhold signal for stopping said member at a random point along the path and interrupting the successive operations of said means (b) and (c),
  3. means for storing signals representing the axis coordinates of the stopping point of said member each time it is so stopped,
  4. means effective after said member has been so stopped for moving said member independently of said means (a) and (c) to various desired locations displaced from said stopping point by jogging type movements which are executed in succession and in any desired number,
  5. means for creating and storing signals which represent the axis component displacements between any said location at which said member resides and said stopping point,
  6. means responsive to a restart signal for causing said system means (b) and (c) to resume their interrupted operation, and
  7. means for rendering said means (6) ineffective until said axis component signals have been reduced to zero in consequence of said member being returned to the last of said stopping points.

10. In a numerical control system for controlling the movements of a member along plural axes to execute a pre-programmed path, said system including
  a. control means responsive to a block of command signals for moving said member simultaneously through axis components defined by such signals and making up a resultant path segment,
  b. means for supplying a program of successive blocks of command signals to said control means (a) so that the member is moved seriatim through successive connected segments constituting a programmed path, and
  c. means responsive to the appearance and continued existence of a cycle start signal for initiating and continuing the successive cyclic operation of said means (a) and (b), the improvement comprising, in combination,
    1. means for producing a cycle start signal,
    2. means for producing a feedhold signal at random instants,
    3. means responsive to said feedhold signal for turning off said means (1) and causing said member to halt at a random stopping point on the path,
    4. means for creating and storing signals which represent the axis coordinates of said stopping point each time the member is so stopped,
    5. means for moving said member independently of said means (b) to various desired locations displaced from said stopping point, 6. means for producing signals which substantially continuously designate axis coordinates of said member as it resides in said various locations, and
7. means for preventing said means (1) from being turned on unless the signals from said means (6) are in agreement with the signals from said means (4).

11. The improvement set out in claim 10 further characterized in that said means (7) include:
  7a. means responsive to the signals from said means (6) and (4) for creating departure signals representing the axis component displacements between said stopping point and the location at which the member resides, and
  7b. means responsive to said departure signals for preventing turn-on of said means (1) until the member has been moved through the said axis component displacements to reach said stopping point.

12. In a numerical control system for moving a member simultaneously along plural axes to execute a programmed path, said system including
  a. control means responsive to a program of successive blocks of command signals for automatically moving the member seriatim along respective corresponding path segments, the improvement comprising
    1. means responsive to a feedhold signal for interrupting the operation of said control means (a) and stopping the member at a random point along the path,
    2. means for storing signals representing the axis coordinates of the member's stopping point each time it halts in response to a feedhold signal,
    3. means effective after said member has so stopped for moving the member under manual selection control to various successive desired locations displaced from said stopping point,
    4. means for producing signals representing the axis coordinates of the location of said member as and after it is moved by said means (3),
    5. operator-actuated means for causing said control means (a) to resume operation,
    6. means for comparing said stopping point coordinate signals from said means (2) with the location coordinate signals from said means (4), and
    7. means controlled by said means (6) for rendering said operator-actuated means (5) ineffective unless and until said comparing means (6) finds substantially equality of the respective compared signals.

13. The combination set forth in claim 12 further including
  8. means for determining and visually displaying the differences between respective pairs of said stopping point coordinate signals and said location coordinate signals, whereby an operator may actuate said means (3) until the displayed differences are reduced to zero, after which the operator may actuate said means (5) to effect resumption of operation of said means (a).

14. In a numerical control system for controlling the movements of a member simultaneously along plural axes to execute a programmed path, said system including
  a. control means responsive to a program of successive blocks of command signals for automatically moving the member seriatim along respective corresponding path segments, the improvement comprising
    1. means responsive to a feedhold signal for interrupting the operation of said control means (a) and stopping the member at a random point along the path,
    2. means for storing signals representing the axis coordinates of the stopping point of the member each time it halts in response to a feedhold signal,
    3. means effective after the member has so stopped for moving the member under manual selection control to various successive desired locations displaced from said stopping point,
    4. means responsive to said stopping point coordinate signals for producing signals which represent the axis component displacements between said stopping point and any location in which the member resides after movement thereof by said means (3),
    5. a restart switch and means responsive to momentary actuation thereof fore causing said control means (a) to resume operation, and
    6. means for disabling said cycle start switch responsive means so long as any of the axis component displacement signals from said means (4) represents a value other than substantially zero.

15. The combination set forth in claim 14 further including
  7. means for visually displaying said signals from said means (4), whereby an operator may actuate said means (3) to relocate the member until the displayed signals are reduced substantially to zero, thereby to enable said restart switch responsive means.

16. In a numerical control system for moving a member simultaneously along plural axes to follow a preprogrammed path, said system including
  a. control means responsive to a block of command signals for moving the member along a corresponding path segment having axis components directly or indirectly represented by such command signals, and
  b. means for supplying a program of blocks of command signals sequentially to said means (a) to cause movement of the member seriatim along successive segments of a programmed path, the improvement comprising
    1. means for producing a feedhold signal at random instants in time while said means (a) and (b) are operating,
    2. means responsive to said feedhold signal for interrupting the sequential operation of said means (a) and (b) and stopping said member at a random point on said path,
    3. means for storing signals representing the axis coordinates of the stopping point of the member after it has been so stopped,
    4. means effective after the member has been so stopped for moving the member under manual selection control to various desired locations displaced from said stopping point,
    5. means responsive to said means (3) for producing signals which represent the axis component displacements between said stopping point and the location in which said member resides after movement thereof by said means (4),
    6. means for producing a restart signal, 7. means responsive (i) to said restart signal and (ii) said signals from said means (5) for moving the member through said axis component displacements back to said stopping point, and
8. means responsive to the completion of operation of said means (7) for restoring said means (a) and (b) to normal sequential operation.

17. The combination set forth in claim 16 further including
9. means for producing signals which represent the axis coordinates of the location in which said member resides after movement thereof by said means (4), and further characterized in that said means (5) includes means responsive to the stopping point coordinate signals from said means (3) and the location coordinate signals from said means (9) for producing said axis component displacement signals.

18. In a numerical control system for moving a member simultaneously along plural axes to follow a preprogrammed path, said system including
   a. control means responsive to a block of command signals for moving the member along a corresponding path segment having axis components directly or indirectly represented by such command signals, and
   b. means for supplying a program of successive blocks of command signals sequentially to said means (a) to cause movement of the member seriatim along successive segments of a programmed path,
the improvement comprising
   1. means for producing a feedhold signal,
   2. means responsive to the feedhold signal for interrupting the operation of said means (a) and stopping the member at a random point on said path, and for interrupting the successive supplying by said means (b),
   3. means for storing signals representing the axis coordinates of the stopping point of the member after it has been so stopped,
   4. means effective after the member has been so stopped for moving the member under manual selection control to various desired locations displaced from said stopping point,
   5. means for producing signals which represent the axis coordinates of the location in which the member resides after movement thereof by said means (4),
   6. means for producing a restart signal,
   7. means responsive to said restart signal for supplying to said means (a) an artificial block of command signals representing the axis component displacements between the coordinates represented by the signals from said means (3) and the coordinates represented by the signals from said means (5), and
   8. means responsive to the execution of said artificial block of command signals for restoring said means (a) and (b) to normal sequential operation.

19. The combination set forth in claim 16 further characterized in that said means (4) includes
   4a. manually set selector means for supplying to said means (a) an artificial program block of command signals representing axis component distance through which said member is to be moved from one location to another, whereupon said member is moved to various desired locations displaced from said stopping point.

20. The combination set forth in claim 18 further characterized in that said means (7) includes
   7a. means responsive to the stopping point coordinate signals (SXCP, SYCP) from said means (3) and the location coordinate signals (XCP, YCP) from said means (5) for producing axis component displacement signals representing the differences (XFH = SXCP − XCP, YFH = SXYCP − XCP) between the paired coordinate values, and
   7b. means for supplying to said means (a) an artificial block of command signals which comprises said axis component displacement signals (XFH and YFH).

21. In a numerical control system for moving a member simultaneously along plural axes to execute a programmed path, said system including
   a. control means responsive to a block of command signals for moving the member along a corresponding path segment having axis components directly or indirectly represented by such signals, and
   b. means for supplying successive ones of a program of blocks of command signals to said control means (a) to cause movement of said member seriatim along successive segments of the programmed path.
the improvement comprising
   1. means for interrupting the sequential operation of said means (a) and (b) and stopping the member at a random point on the path,
   2. means effective after said member has been so stopped for moving the member under manual selection control to various desired successive locations displaced from said stopping point,
   3. means for creating and storing signal sets representing the axis components through which said member is moved each time it is changed from one location to another by operation of said means (2), such signal sets being designatable $N_1$, $N_2 \ldots N_n$ in the order of their storage,
   4. means for creating a restart signal,
   5. means responsive to the restart signal for responding to said stored signal sets in the reverse order $N_n \ldots N_2$, $N_1$ including means responsive to each such signal set for moving the member reversely through axis component distances corresponding to the components represented by the signals of such set, and
   6. means for restoring said means (a) and (b) to normal sequential operation after the return motion of said member according to the signal set $N_1$ has been completed.

22. The improvement defined by claim 21 further characterized in that said means (6) includes means responsive to the completion of the member's return movement according to the signal set $N_1$ for automatically restoring said means (a) and (b) to normal sequential operation.

23. In a numerical control system for moving a member simultaneously along plural axes to execute a programmed path, said system including
   a. control responsive to a block of command signals for moving the member along a corresponding path segment having axis components directly or indirectly represented by such command signals, and
   b. means for supplying successive ones of a program of blocks of command signals to said control means (a) to cause movement of said member seriatim along successive segments of the programmed path,
the improvement comprising 1. means for interrupting the sequential operations of said means (a) and (b) and stopping the member at a random point on the path,
2. means effective after said member has been so stopped for moving the member under manual selection control to various desired successive locations displaced from said stopping point,
3. means for creating and storing signal sets directly or indirectly representing the axis components through which said member is moved each time it is changed from one location to another by operation of said means (2), such signal sets being designatable $N_1, N_2 \ldots N_n$ in the order of their storage,
4. means for creating a restart signal,
5. means responsive to the restart signal for supplying said stored signal sets in reverse order $N_n \ldots N_2, N_1$ as artificial blocks of command signals to said control means (a), whereby the latter moves the member reversely along segments identical to, and in the reverse order of, the segments through which such member was moved by operation of said means (2), and
6. means for restoring said means (a) and (b) to normal sequential operation after the return movement according to the signal set $N_1$ has been completed.

24. The combination set forth in claim 23 further characterized in that said means (6) includes means responsive to the completion of the member's return movement according to the signal set $N_1$ for automatically restoring said means (a) and (b) to normal sequential operation.

* * * * *